(12) United States Patent
Malkin et al.

(10) Patent No.: US 6,317,795 B1
(45) Date of Patent: *Nov. 13, 2001

(54) DYNAMIC MODIFICATION OF MULTIMEDIA CONTENT

(75) Inventors: Peter Kenneth Malkin, Ardsley; Robert Jeffrey Schloss, Briarcliff Manor; Edward Charles Snible, New York; Marc Hubert Willebeek-LeMair, Yorktown Heights; Philip Shi-Lung Yu, Chappaqua, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,220

(22) Filed: Jul. 22, 1997

(51) Int. Cl.[7] ..................................................... G06F 15/16
(52) U.S. Cl. .............................. 709/246; 345/433; 435/43
(58) Field of Search ..................................... 709/217, 225, 709/223, 201, 206, 203; 395/615; 455/5.1, 4.2; 348/5.5, 463, 151, 446; 380/20; 707/1, 181, 517, 500; 370/468; 345/335, 433–443, 473, 125, 127; 710/71, 5, 54; 434/43, 38, 20

(56) References Cited

U.S. PATENT DOCUMENTS

| | | | |
|---|---|---|---|
| 4,054,911 | * 10/1977 | Fletcher et al. | 348/463 |
| 4,645,459 | * 2/1987 | Graf et al. | 434/43 |
| 4,930,160 | 5/1990 | Vogel . | |
| 5,237,648 | * 8/1993 | Mills et al. | 345/433 |
| 5,251,301 | * 10/1993 | Cook | 709/246 |
| 5,257,113 | 10/1993 | Chen et al. . | |

(List continued on next page.)

OTHER PUBLICATIONS

Miller et al PIC3 Label Distribution Label Syntax & Communication Protocols www.w3.org/TR/REC–PICS–labels, Oct. 1996.*

Millet et al .Rating Services & Rating Systems www.srl.r-mit.edu. au/webdiy pics/services.htm, Oct. 1996.*

(List continued on next page.)

*Primary Examiner*—Mehmet B. Geckil
*Assistant Examiner*—Thong Vu
(74) *Attorney, Agent, or Firm*—F. Chau & Associates, LLP

(57) ABSTRACT

A method and system for manipulating or modifying identifiable objects in a standard broadcast or Internet-based multimedia stream according to a control specification and a content specification. Viewers and/or organizations can independently specify acceptable levels of content on multiple dimensions to satisfy the content specification while minimizing the filtering or blocking to the viewers. A "fuzz ball" control specification is provided for masking some portion of a video frame. Several fuzz ball specifications can be overlaid to address multidimensional content specifications or rating systems. The manipulation of the multimedia stream can take place at the client (set-top box or computer), intermediate node, the content server or a combination thereof. Proxy servers can modify content specifications for outgoing requests, enabling organizations to specify intranet-wide policies. Multicasting can be supported by using a single stream delivered to multiple clients, each modifying the video using a different specification. The specification to facilitate modification can be done at different granularity levels: the video, a group of frames, or individual frame level and can also be time-based. Various protocols can be used to provide the content and/or control specification, including the VBI of a standard broadcast, PICS, RTSP and MPEG protocols.

68 Claims, 13 Drawing Sheets

U.S. PATENT DOCUMENTS

| | | | | |
|---|---|---|---|---|
| 5,321,750 | * | 6/1994 | Nadan | 380/20 |
| 5,410,344 | | 4/1995 | Graves et al. | |
| 5,434,678 | | 7/1995 | Abecassis | |
| 5,550,575 | | 8/1996 | West et al. | |
| 5,642,511 | * | 6/1997 | Chow et al. | 717/1 |
| 5,671,225 | * | 9/1997 | Hooper et al. | 370/468 |
| 5,675,752 | * | 10/1997 | Scott et al. | 395/333 |
| 5,705,507 | * | 1/1998 | Schloss | 395/615 |
| 5,706,507 | * | 1/1998 | Schloss | 395/615 |
| 5,758,258 | * | 5/1998 | Shoff et al. | 455/5.1 |
| 5,826,025 | * | 10/1998 | Gramlich | 709/217 |
| 5,832,310 | * | 11/1998 | Morrisey et al. | 710/71 |
| 5,869,819 | * | 2/1999 | Knowles et al. | 235/375 |
| 5,878,233 | * | 3/1999 | Shloss | 709/225 |
| 5,881,183 | * | 3/1999 | Lee | 382/288 |
| 5,918,223 | * | 6/1999 | Blum et al. | 707/1 |
| 5,928,325 | * | 7/1999 | Shaughnessy et al. | 709/206 |
| 5,958,008 | * | 9/1999 | Pogrebisky et al. | 709/223 |
| 5,960,173 | * | 9/1999 | Tang et al. | 709/201 |
| 6,024,417 | * | 2/2000 | Ross et al. | 707/517 |
| 6,029,175 | * | 2/2000 | Chow et al. | 707/104 |
| 6,040,830 | * | 3/2000 | Sahon | 345/335 |

OTHER PUBLICATIONS http://www.microsys.com/cpc/cpc_fact.htm Jul. 7, 1997, "Cyber Patrol Corporate Fact Sheet", pp. 1–3.

http://www.rsac.org/talk/dianne1.html, Jul. 7, 1997, Recreational Software Advisory Council, C.D. Martin et al. "An Alternative to Government Regulation and Censorship: Content Advisory Systems for the Internet", pp. 1–12, Jul. 7, 1997.

http://cm.bell—labs.com/who/bsb/signet/Overview.html, Jul. 7, 1997, B. Baker et al., "Local Control over Filtered WWW Access", pp. 1–13.

http://vancouver–webpages.com/PICS/HOWTO.html, Jul. 7, 1997, "PICS How to–using PICS headers in HTML" pp. 1–3.

http://www.spa.org/publications/upgrade/balkam.htm, Jul. 7, 1997, Recreational Software Advisory Council, S. Balkam, "Upgrade, How Do You Measure Up" pp. 1–3.

http://www.q–team.de/mpeg4/contcrea.htm, Feb. 19, 1997, "Q–Team Dr. Knabe, MPEG–4 content creation", 3p.

http://www.q–team.de/mpeg4/whatmpeg.htm, 5/97 "Q–Team Dr. Knabe, What is MPEG–4", 3p.

HFN The Weekly Newspaper for the Home Furnishings Network, Jan. 13, 1997, p. 164, PTS 970403607, J. Bloomfield, "V Chip Converter Debuts".

http://www.tri–vision.ca/debate.htm, "The V–Chip Debate: Censorship or Empowerment", 1996 Tri Vision International LTD./LTEE.

http://www.tri–vision.ca/vchip.htm, "The V–Chip", 1996 Tri Vision International LTD./LTEE.

http://www.shepherd.net, "Net Shepherd", 1997, Net Shepherd Inc.

http://www.w3.org/PICS/#Specs, Sep. 11, 1995, Oct. 29, 1996, "Platform for Internet Content Selection".

Scientific American Article by Paul Resnick, Mar. 1997, pp. 106–108, "Filtering Information on the Internet".

http://www.w3.org/PICS/iacwcv2.htm, Communications of the ACM, 1996, vol. 39 (10), p. 87–93 "PICS:Internet Access Controls Without Censorship" by Paul Resnick and Jim Miller.

http://www.microsy.com/pics/sofware.htm, Jul. 3, 1997, "Client Software Based on PICS".

http://www.surfwatch.com, Surf–Watch from Spyglass.

"PICS Profile Language Working Group—PICSRulz 1.0", C. Evans, A. Hopmann, M. Presler–Marshall, P. Resnick, Jun. 27, 1997.

* cited by examiner

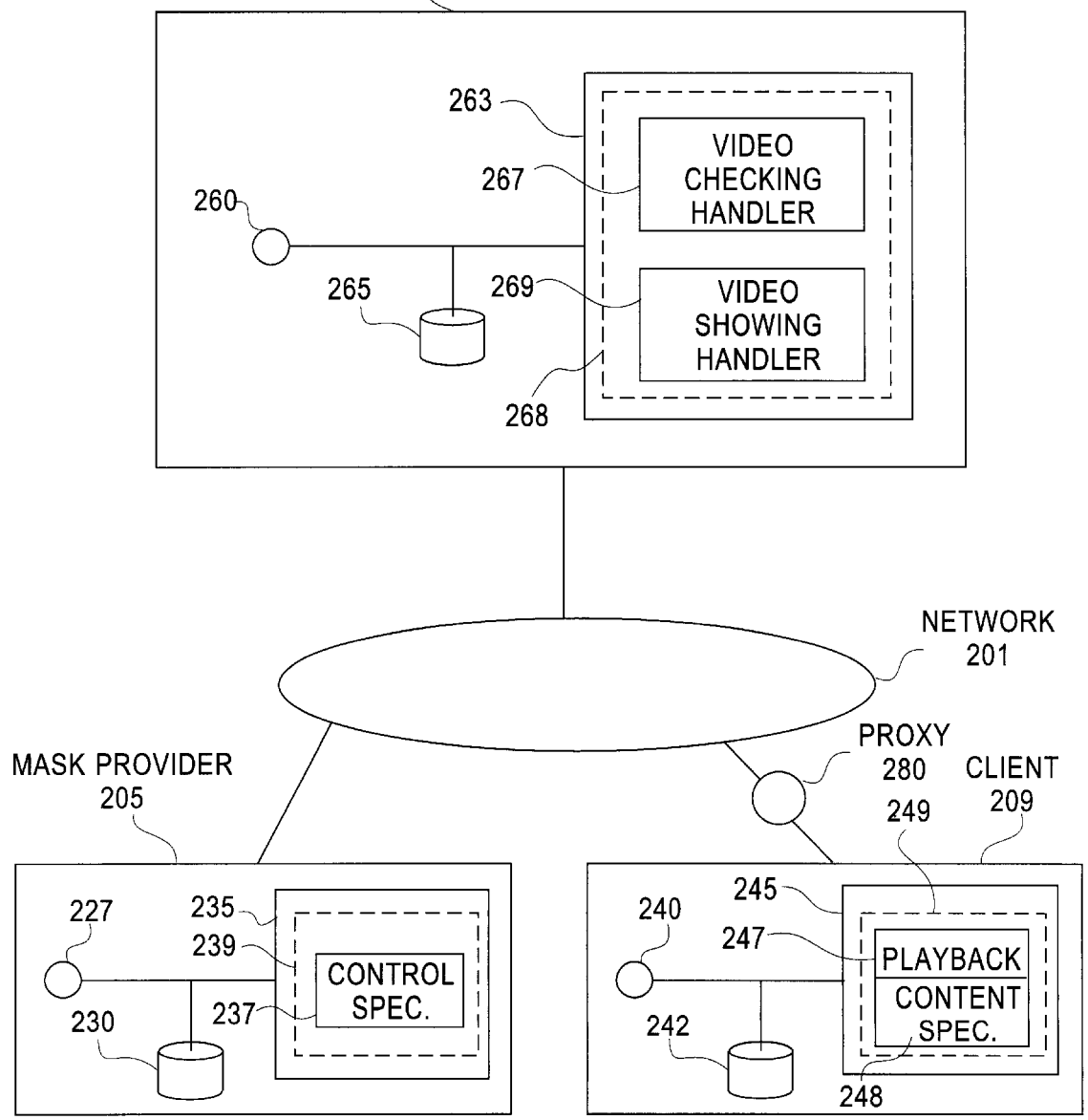

DYNAMIC MODIFICATION OF MULTIMEDIA CONTENT

FIELD OF THE INVENTION

The present invention relates generally to a dynamic masking and modifying of multimedia content based on a content specification.

BACKGROUND

As the World Wide Web (WWW) becomes increasingly popular, there is a general concern about the content of Web sites. Ideally, users should have control over the content which enters their homes.

A recently established standard allows a content specification as meta data in an object header using existing Web protocols such as the hypertext transfer protocol ("HTTP"). The Platform for Internet Content Selection ("PICS") protocol specifies one method of sending meta-information concerning electronic content. PICS is a Web Consortium Protocol Recommendation (see http://www.w3.org/PICS). PICS was first used for sending values-based rating labels, such as "How much nudity is associated with this content," but the format and meaning of the meta-information is fully general. In PICS, meta-information about electronic content is grouped according to a "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content. Each PICS label for a specific piece of electronic content may be added or removed from the content independently.

For example, an image file may be sent from a server with a single PICS label whose "rating service" field indicates it contains values-based rating labels according to the "Safe-Surf" rating system. The HTTP protocol has been augmented with request headers and response headers that support PICS. The technical bodies which define other common application protocols, such as NNTP, are now also considering adding PICS support. As part of these protocols, a list of the types of PICS labels desired may be included with a request. PICS also specifies a query format for receiving PICS information from a central label bureau server. A sample PICS label is: (PICS-1.1 "http://the.rating.service" label for "http://the.content" exp "1997.07.01T08: 15–0500" r (n 4 s 3 v 2 1 0)) where the 'n' 's' 'v' 'l' are transmit names for various meta-information types, and the applicable values for this content are 4 (for n), 3 (for s), 2 (for v) and 0 (for l). Only software which recognizes the ID "http://the.rating.service" would know how to interpret these categories and values.

The prior art includes various systems directed towards storing user preferences to select correspondingly encoded videos, and/or video streams. For multimedia streams, such as video and audio, rating an entire multimedia presentation using a single rating lacks flexibility. For example, one scene containing violence or sexually explicit content in a 2-hour video can result in the video receiving a high violence or high sexual content rating, thus blocking it from being viewed based on most user specifications.

For example, U.S. Pat. No. 4,930,160, entitled "Automatic Censorship of Video Programs," issued May 29, 1990 to Vogel, is directed to using classification codes to switch from a first video stream to an alternative video stream previously selected by the viewer. In addition to the aforementioned lack of flexibility, the censorship standards utilized under this proposal would likely come from a central censorship authority. This approach also requires the participation of the broadcasters if it is to be effective.

Another example, U.S. Pat. No 5,550,575, entitled "Viewer Discretion Television Program Control System," issued Aug. 27, 1996 to West et al., provides both time and content controls for multiple and variable numbers of viewers. The controls however, are at the granularity of the entire video.

Still another example, U.S. Pat. No. 5,434,678, entitled "Seamless Transmission of Non-Sequential Video Segments," was issued Jul. 18, 1995, to Abecassis. Abecassis is directed to the selective retrieval and seamless transmission of non-sequentially stored video segments of a variable content video program, responsive to a viewer's pre established video content preferences. Here, video segments from a single source can be selected by applying video content preferences to a video segment map. This approach also requires the generation of the variable content video program and the participation of the broadcaster, if it is to be effective.

Thus, the need remains for a system and method for rating and flexibly modifying multimedia content so that specific objects, for example a portion of a single video frame or sample of audio, can be dynamically masked, filtered, or modified according to the user's content specification. The need also remains for a system which does not require the generation of customized or variable content, or the participation of the broadcaster to be effective. The present invention addresses such a need.

Moreover, the need remains for such a video delivery system and method within an Internet and World Wide Web compatible transmission system such as HTTP. Furthermore, there is a need for a system which can be flexibly applied in the presence of a hierarchy of nodes. The present invention addresses such a need.

SUMMARY

In accordance with the aforementioned needs, the present invention is directed to an improved method and apparatus for dynamically modifying multimedia content at an object-level, based on a viewer content specification. Examples of objects include any identifiable objects in a multimedia stream, including but not limited to a portion of a video frame or a sample of audio. Examples of such multimedia streams include an audio stream, a video stream or a combination one or more of these streams.

Various embodiments describe a control specification which can be part of the multimedia stream or provided as a separate stream, which can be provided by third parties. For example, in an Internet environment, a PICS-based control specification is detailed. The PICS control specification can be part of the multimedia stream itself, or separately developed and transmitted for dynamic modification of the content. A PICS-based content specification is also provided wherein viewers can specify multidimensional content preferences.

The present invention has features which can dynamically modify and mask multimedia streams in a proxy hierarchy on the Internet. For example, objects in a multimedia stream can be flexibly modified at a client station such as a set-top box or computer; an intermediate computer node such as a proxy node or gateway; a content server; or a collaborative combination of one or more these nodes.

The present invention has yet other features which allow organizations to specify intranet-wide policies, for example, by enabling an intermediate node to add or merge content specifications for outgoing requests. The present invention has still other features for applying multiple masks (control specifications) even if supplied by different sources.

An example of a method having features of the present invention for modifying objects associated with content of a multimedia stream, includes the steps of: receiving a content request including a content specification; and dynamically modifying one or more objects on one or more dimensions of the multimedia stream based on the content specification and a control specification.

One embodiment of the present invention has features for dynamically modifying a portion of a video frame according to a "fuzz ball" control specification. The resulting fuzz ball can modify/mask one or more specified objects, such as a portion of a video frame or sample of audio, according to user specifications.

The present invention has still other features for notifying the user, prior to transmission, of the percentage of the video that will be blocked according to the specification.

The present invention has yet other features for overlapping several fuzz ball specifications in response to content specifications covering multiple dimensions or rating systems. Furthermore, the present invention has still other features for multicasting a single multimedia stream to multiple viewers, with each client (209) rendering or masking the video using a customized specification.

BRIEF DESCRIPTION OF THE DRAWINGS

These, and further, objects, advantages, and features of the invention will be more apparent from the following detailed description of a preferred embodiment and the appended drawings wherein:

FIG. 2 is a more detailed example of a network environment having features of the present invention;

DETAILED DESCRIPTION

Figure 1:
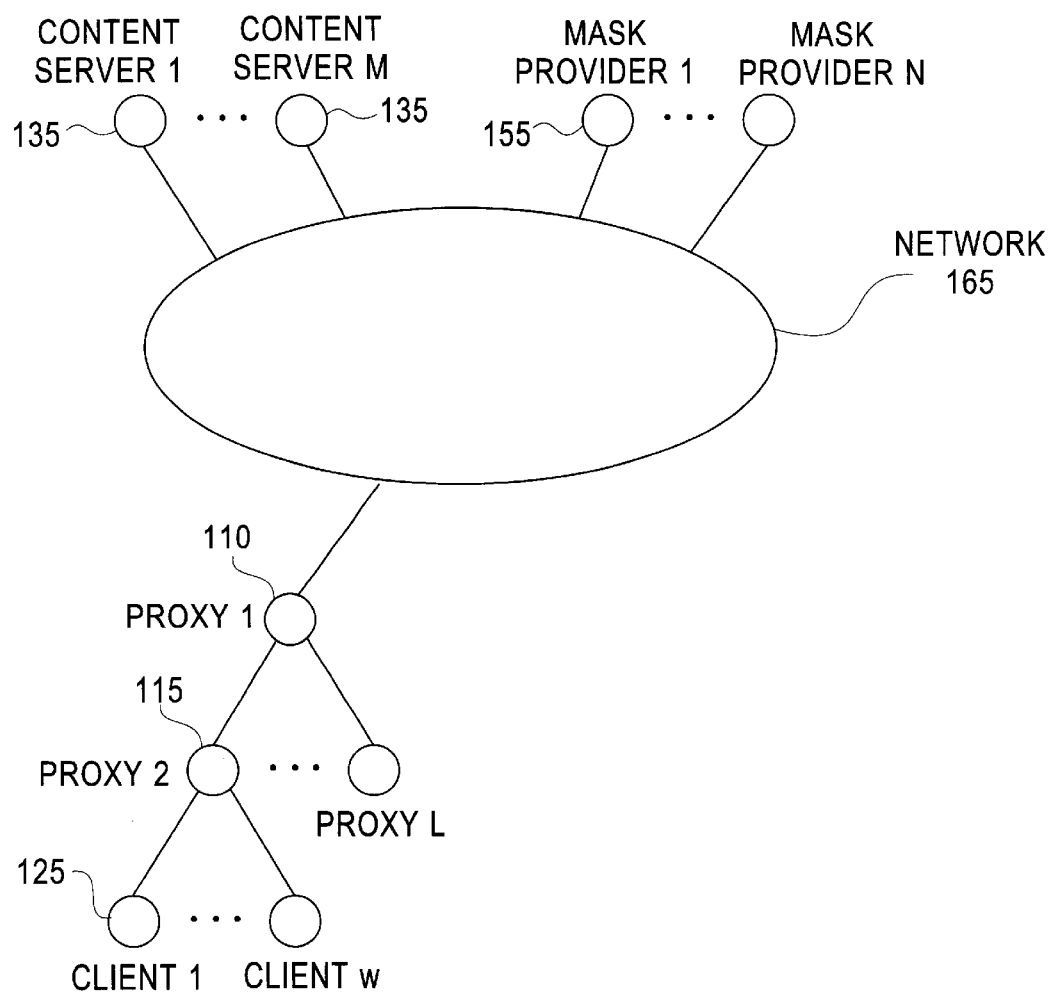
FIG. 1 is a diagram of an Internet environment having features of the present invention.

FIG. 1 depicts an example of an Internet environment having features of the present invention. As depicted, one or more content servers (135) are connected to a network (165) whereas client stations (125), such as a set top box or a client (125) in accordance with the present invention, may be connected directly or through a proxy hierarchy (110–115) to the network (165). A content server node (135) can be any computing node that can serve multimedia requests through the network. Third party mask providers (155) can provide pre-constructed frame-level masks (as will be discussed in more detail with reference to FIG. 3a) which can be used in accordance with the present invention to dynamically modify the content at a fine granularity, e.g., frame-level, to filter out undesired information.

The client (125) communicates a multimedia content request including a multidimensional content specification (248), (as will be discussed in more detail with reference to FIG. 9) such as a medium violence level and low nudity level to a server (135) via the network (165).

According to the present invention information can be efficiently communicated between a client (125), server (135) and/or mask provider (155) using piggybacked meta data. In a HTTP implementation, the information exchange can be included as meta data in an object header using existing web protocols. The Platform for Internet Content Selection ("PICS") protocol specifies a method of sending meta-information concerning electronic content. PICS is a Web Consortium Protocol recommendation (see http://www.w3.org/PICS). PICS was first used for sending values-based rating labels, such as "How much nudity is associated with this content," but the format and meaning of the meta-information is fully general. In PICS, meta-information about electronic content is grouped according to the "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content. Each PICS label for a specific piece of electronic content may be added or removed from the content independently.

For example, an image file may be sent from a server with a PICS label whose "rating service" field indicates it contains values-based rating labels according to the "SafeSurf" rating system. According to the present invention, as the image file passes through an enterprise proxy, the file may be processed or updated with a new category value for the PICS label to reflect the current content according to the "rating service." Thus, the client computer will only see the updated category value of the PICS label. The HTTP protocol has been augmented with request headers and response headers that support PICS. A sample PICS label is: (PICS-1.1 "http://the.rating.service" label for "http://the.content" exp "1997.07.01T08:15–0500" r (n 4 s 3 v 2 1 0)) where the 'n' 's' 'v' 'l' are transmit names for various meta-information types, and the applicable values for this content are 4 (for n), 3 (for s), 2 (for v) and 0 (for l). Only software which recognizes the ID "http://the.rating.service" would know how to interpret these categories and values. The technical bodies which define other common application protocols, such as NNTP, are now also considering adding PICS support. As part of these protocols, a list of the types of PICS labels desired may be included with a request. PICS also specifies a query format for receiving PICS information from a central label bureau server. In a preferred embodiment, discussed in more detail below, the content specification (248) can also be communicated using a PICS profile language, such as PICS rule 1.0.

Returning to FIG. 1, according to the present invention, organizations may specify intranet-wide policies via the proxies (110, 115) ability to add to content specifications for outgoing requests, or merge different specifications. According to another embodiment of the present invention, the server (135) is adapted to determine if the specification can be met (as will be discussed in more detail with reference to FIG. 5), and if so, communicate a mask request (as will be discussed in more detail with reference to FIG. 10) to the mask provider (155). The mask provider selects a control specification (237) (also called a mask), that can be used to modify the content to satisfy the viewer's specification, and sends it to the server (135) (as will be discussed in more detail with reference to FIG. 11). Those skilled in the art will appreciate that the control specification could also be stored at the content server (203). In various embodiments, the control specification (237) can be applied by the server (135), and/or the proxies (110) and/or the client (125); multiple control specification (237) s, supplied from different sources, may also be applied. The objects, such as a portion of a video frame or a sample of audio, can be dynamically modified according to the selected control specification (237), before being displayed at the client (209) (as will be discussed in more detail with reference to FIGS. 7–8, and 10).

Examples of a client (125) include, but are not limited to a PC, workstation and set top box, etc. In the PC, or workstation environment, the client software preferably includes, but is not limited to, video playback software such as are sold by IBM under the trademarks VIDEO CHARGER PLAYER, or by Progressive Networks under the trademark REAL VIDEO PLAYER. Examples of the network (165) include, but are not limited to, the Internet, the World Wide Web, an Intranet and local area networks (LANs). Examples of a content server (135) for video can include, but are not limited to products such as are sold by IBM under the trademark VIDEO CHARGER, and by Progressive Networks under the trademark REAL VIDEO. An example of the proxy server (110–115) is that sold by IBM under the trademark Internet Connection Server (ICS). The content server (135) or proxy server (110–115) can run on any computing node, which includes, but is not limited to, products such as are sold by IBM under the trademarks S/390 SYSPLEX, SP2, or RS6000 workstations.

FIG. 2 depicts a more detailed example of a network (201) and system having features of the present invention. As depicted, the system includes a client (209) such as a conventional workstation, PC or a set-top box. The client (209) can issue requests via the network (201) for multimedia content including a content specification (248) on one or more dimensions of the content. The client (209) preferably includes a CPU (240), memory (245) such as RAM, and storage devices (242) such as DASD. The memory (245) stores the client logic (249) (as will be discussed in more detail with reference to FIG. 9) according to the present invention, preferably embodied as computer executable code which is loaded from remote (over the network) or local permanent optical (CD-ROM) or magnetic storage such as disk, or DASD (242) into memory (245) for execution by CPU (240). The client logic (249) includes video playback operation (247) logic (as will be discussed in more detail with reference to FIG. 10).

Figure 11:
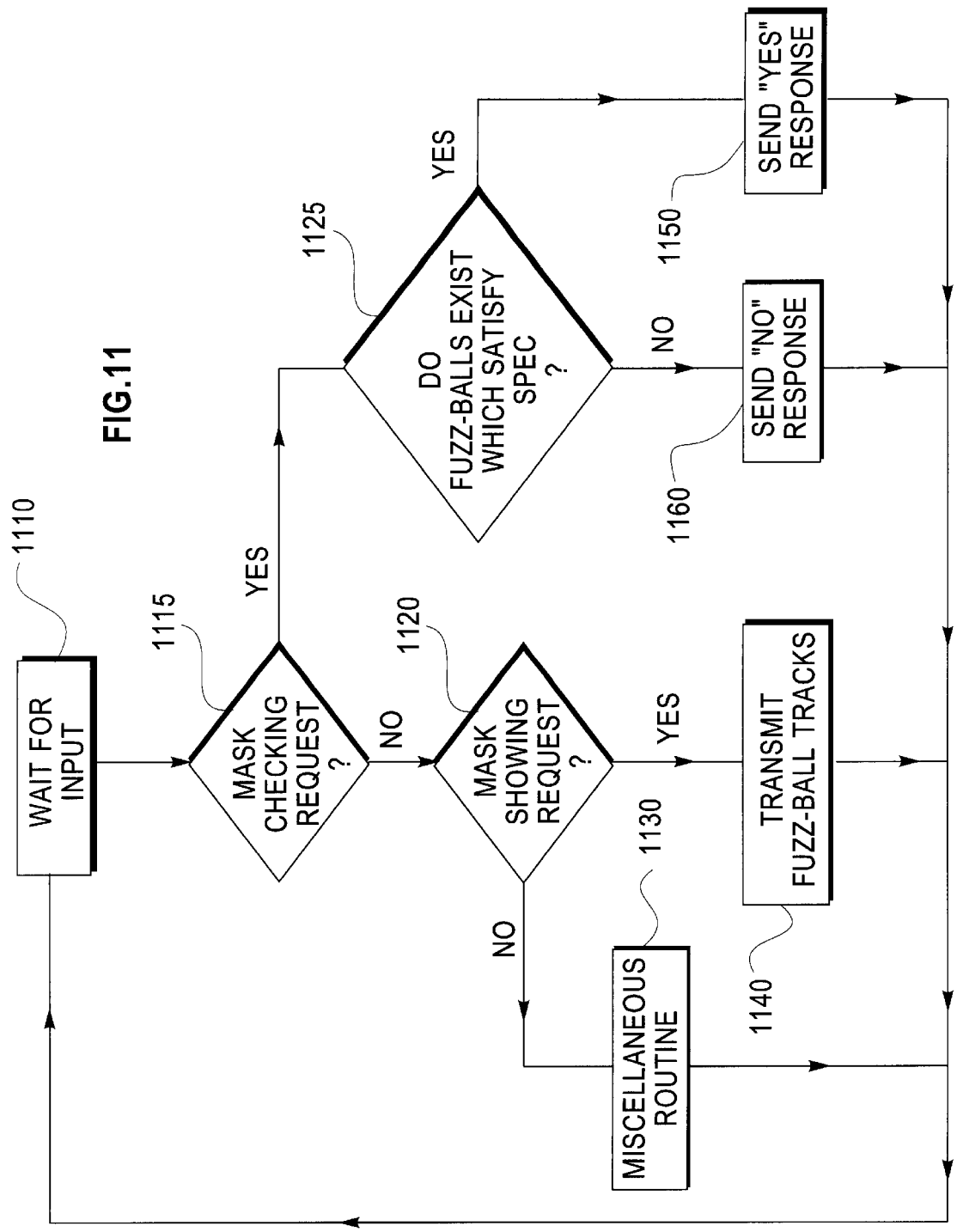
FIG. 11 is an example of the mask provider logic of FIG. 2.

A mask provider (205) preferably includes a CPU (227), memory (235) such as RAM, and storage devices (230) such as DASD. The memory (235) stores the mask provider logic (239) (discussed in more detail with reference to FIG. 11) preferably embodied as computer executable code which is loaded from DASD (230) into memory (235) for execution by CPU (227). The mask provider has various control specifications (237), in this case fuzz ball tracks (337) (as will be discussed in more detail with reference to FIG. 3) for dynamically modifying or masking out portions of one or more frames of a video according to the content specification (248). The fuzz-ball track specification (as will be discussed in more detail with reference to FIG. 3) may comprise a separate stream or be contained in a separate file from the video stream (390) and can be interpreted at the content server (203), client (209) or an intermediate node such as the proxy (280) to modify or mask objects in the video stream (390) (an example of the mask provider logic is depicted in FIG. 11). In any event, a fuzz ball (397) can be created based on the control specification to modify the content before it is displayed at the client station.

A content server node (203) can be any conventional computing node that can serve requests through the network (201). The content server (203) preferably includes a CPU (260), memory (263) such as RAM, and storage devices (265) such as a disk or DASD (265). According to the present invention, the server logic (268) (as will be discussed in more detail with reference to FIG. 4) preferably embodied as computer executable code, is loaded from remote (over the network) or local permanent optical (CD-ROM) or magnetic storage such as disk, or DASD (265) into memory (263) for execution by CPU (260). The server logic (268) preferably includes a video checking handler (267) (discussed in more detail with reference to FIG. 5) and a video showing handler (269) (discussed in more detail with reference to FIG. 6). The video checking handler determines if there is a version of a requested video that can be modified or masked to satisfy the content specification. If so, the version closest to the content specification (248) is selected. The video showing handler (269) delivers the video stream based on the content specification. The video stream is preferably sent separately from the control specification (237) for rendering downstream, before it is displayed at the client station.

By way of overview, a client (209) first communicates a content request including a multidimensional content specification (248), such as a medium violence level and low nudity level, via the client (209). As a result, a video checking request (as will be discussed in more detail with reference to FIG. 5) may be communicated to the content server if a threshold determination is to be made whether the specification can be met. In a preferred embodiment, the server response can be either unequivocal such as "yes," (such a version exists), or qualified, e.g., a version can be delivered, but with 20% blocked out. If the viewer/client (209) finds the response acceptable, a video showing request (discussed in more detail with reference to FIG. 6) is communicated to the content server (203) to request delivery of the modified video.

If the content specification (248) can be satisfied, a mask showing request (FIG. 9) can be sent to the mask provider (205) to get the corresponding control specification (237) or fuzz-ball track (FIG. 3). Those skilled in the art will appreciate that the mask provider logic (239) and control specifications (237) can also reside at the content server (203) or some intermediate node. The mask provider (205) selects one or more control specifications (237) that can satisfy the viewer's multidimensional specification, based on their labels (as will be discussed in more detail with reference to FIG. 8). If the control specification (237) is to be applied by the server (203), the content is modified according to the control specification (237) before it is transmitted to the client (209).

Preferably, the control specification (237) is transmitted along with the original video stream as an additional track (or stream) (as will be discussed in more detail with reference to FIG. 10). For example, for a multicast video, different viewers may have many different specifications. It is thus more efficient for the content server (203) to include the various control specification (237) with the multicast transmission and let each client (209) flexibly select and dynamically apply the appropriate control specification (237). In another example, an organization (such as a school or corporation) or individual users or subgroups within the organization may each have a different content specification (248). Again, it is more efficient for the content server (203) to provide the control specification (237) with the transmission and let each intermediate (proxy) server and client station apply the appropriate control specification (237) to modify the content as the video passes through.

Figure 3A:
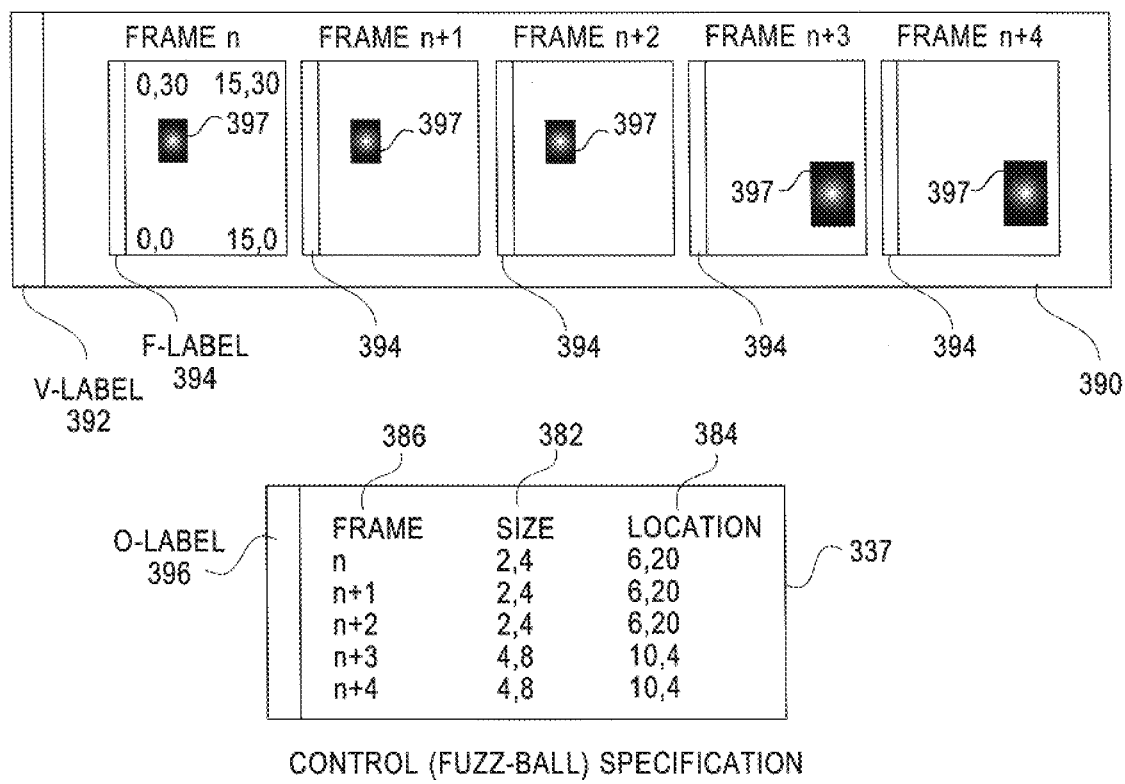
FIG. 3a depicts examples of the "fuzz-ball" of FIG. 2 and a "fuzz-ball" control specification.

FIG. 3a depicts an example of a video stream (Frame n ... Frame n+4) modified with a set of fuzz-balls (397) generated according to a control specification (237). In this example, the control specification (237) is a separate "fuzz ball" track (337) wherein a fuzz-ball (397) can be represented as a rectangular region which can modify an object such as a portion of a video frame or a sample of audio. The effect on the content rating that will be achieved by applying the fuzz-ball track (337) can be indicated in an O-label (396) using the PICS protocol in the header of the track. A fuzz-ball can be generated in a variety of conventional ways, such as by manipulating or overlaying the audio or video data. The fuzz ball track (337) can specify a sequence of fuzz-balls (397) having a fuzz-ball size (382) and location (384) and a temporal relationship (386) to the video stream (390). For example, the video stream (390) includes five consecutive frames (Frame n ... Frame n+4) having a known dimension (15,30). The placement of a fuzz ball (397) in the video stream can be represented in the fuzz-ball track (337) as a file. The temporal relationship of the fuzz ball (397) to the stream can be specified by a frame number (386) or other means such as a time-stamp or any means to identify a particular object to be modified; a size (382) (height and width dimensions); and a location (384) (x and y coordinates) within the video frame. In this example, the fuzz-ball track (337) specifies Frame n as having a a fuzz-ball (397) of size (2,4) at location (6,20). In Frame n+3 the location (10,4) and size (4,8) are changed. As will be described below, multiple fuzz-ball tracks (337) can be associated with the same stream (390) and can be combined to achieve a comprehensive but fine-grained modification of objects in the video stream. Also as will be discussed in more detail below, the content specification (248) communicated from a client 209 can advantageously cover multiple dimensions such as violence, profanity and nudity levels. Different fuzz-balls (397) can accordingly be provided for each dimension at each level. The control specification (237) may be stored in a separate file from the video stream, for example by third party mask providers (205) for transmission to the content server (203) upon request. An example of the mask provider logic will be described with reference to FIG. 11. As will be described in more detail with reference to FIG. 10, the control specification (237) is preferably communicated with the content from the content server (203) and dynamically interpreted at the client, based on the control specification (237) to modify the corresponding objects in the video stream (390) (before display) at the client station.

By way of overview, consider for example that a client (209) specifies in a video request a content specification (248) having a violence level value no higher than 3 and a nudity level value no higher than 2, and the requested video has a violence level rating value of 5 and a nudity level rating value of 4. Assume that the higher the rating, the more violence and nudity the video contains. Preferably, when multiple control specifications (237) are combined, the minimum category value at each dimension among the fuzz-ball tracks is the resulting category value of that dimension. Thus, the mask provider can produce fewer control specifications (237) to support more combinations of content specifications (248) across multiple dimensions. In this example, to satisfy the content specification (248), control specification (237) is needed that has either an O-label (396) with a resulting violence level value of 3 and another with an O-label (396) with a resulting nudity level value of 2, or a single fuzz-ball track that can deliver both. For example, consider that there is one control specification (237) having a violence level value of 3 and a nudity level value of 4 and another having a violence level value of 5 and a nudity level value of 2. According to the present invention, by combining these control specifications (237) in the video, a violence level value of 3 and a nudity level value of 2 will be achieved. Specifically, the minimum nudity level value in the above example is 2 and the minimum violence level value in the above example is 3. This feature of combining control specifications (237) advantageously minimizes the number of control specifications (237) that need to be maintained.

Returning again to FIG. 3a in more detail, examples of three different kinds of PICS labels in accordance with the present invention are depicted. A video label (392) (also called a "V-label"), can be used by the content server node to identify a content rating for the whole video.

As will be discussed in greater detail below, a frame label (394) (also called a "F-label"), can be used by the content server to identify a content rating and/or modify objects in the video stream (390). As a given video frame is masked, or modified, the category value of the F-label can be updated to reflect the current content rating of the frame.

In one embodiment, the control specification (237) is transmitted as a separate stream (or file), which in this embodiment will be called a "fuzz-ball track" (337). Preferably, each "fuzz-ball track" (337) contains an overlay label (396) (also called an "O-label") in its header. The O-label (396) can be used to specify the resultant content rating after the fuzz ball (397) is applied to an object in the stream (390). Based on the content specification (248), appropriate fuzz-ball tracks (337) are selected as to modify the content.

In a preferred embodiment, the PICS Profile language, known as PICS Rule-1.0, is used to make a content request with a content specification (248). PICS is a World Wide Web Consortium ("W3C") draft recommendation. See, for example, the "PICS Profile Language Working Group— PICS RULZ 1.0," which can be found at http://www1.raleigh.ibm.com/PICS/PicsRULZ.html and is hereby incorporated by reference in its entirety. Those skilled in the art will appreciate that many other conventional means for storing and communicating a content specification (248) can be used within the spirit and scope of the present invention.

Figure 3B:
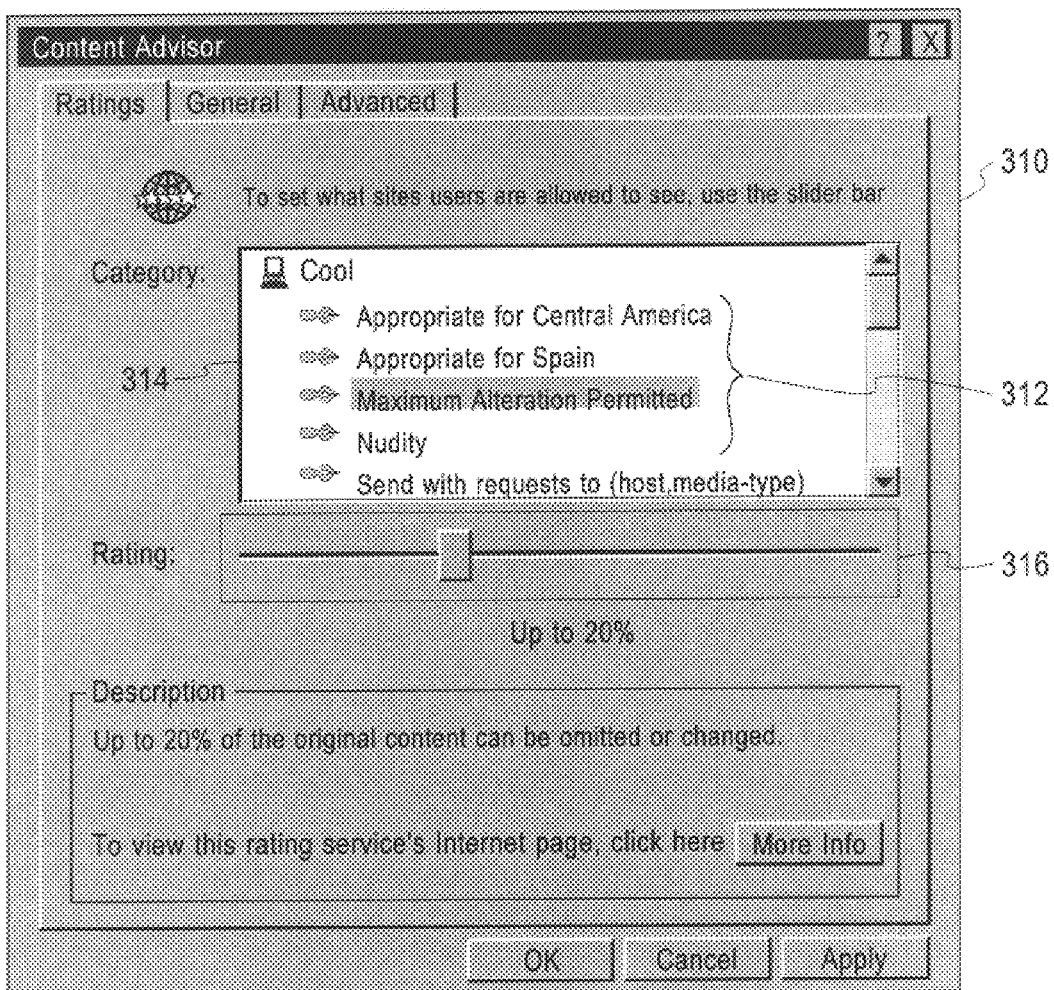
FIG. 3b depicts an example of a user interface for storing a content specification in accordance with the present invention.
Figure 3C:
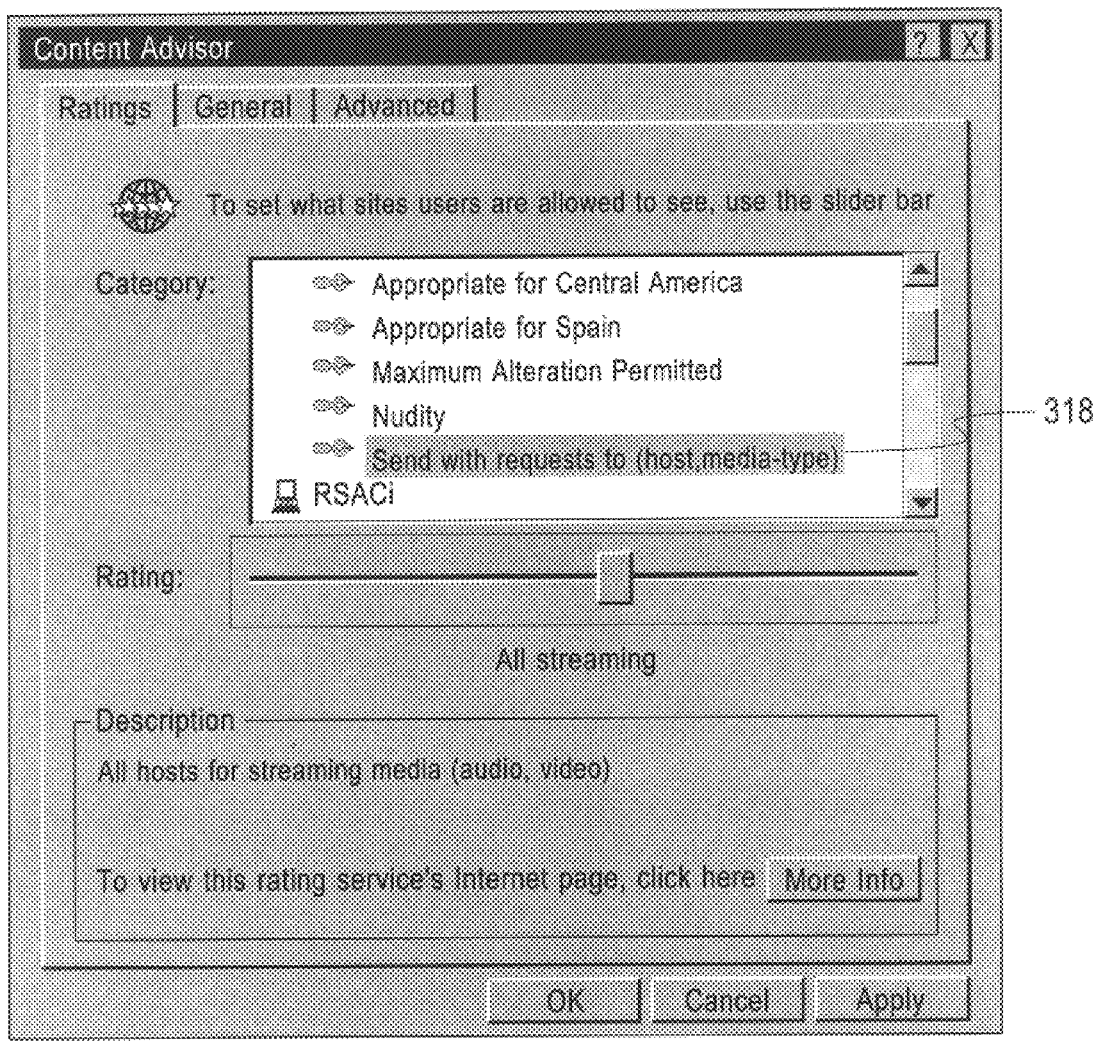

FIG. 3b and FIG. 3c depict an example of a user interface for storing a content specification (248) in accordance with the present invention. In an Internet environment, the Content Advisor (310) user interface can be incorporate, by means well known to those skilled in the art, as part of a browser executing on the client (209). Alternately, or additionally, a proxy administrator at the proxy (280) can specify the content specification (248) in a convenient way. As depicted in FIG. 3a, one or more dimensions (312) of the content can be selected for modification via the Category (314) listing. Optionally, a Rating (316) control can be provided to specify the maximum percentage of content that may be modified. As will be discussed below, the content specification (248) can be stored in the PicsRule-1.0 language. As depicted in FIG. 3b, a host/media type (318) can also be specified to indicate the types of hosts and media for which content requests should be accompanied by the content specification (248). In this example, all host for streaming media (audio and video) is specified. The content specification (248) can be stored in permanent storage such as DASD (242). As will be discussed in more detail below, from then on, requests to a content server (203) will include the HTTP request header: PicsRule: (the rule). See for example, the browser sold by Microsoft under the trademark INTERNET EXPLORER 3.0, which provides a dialog box called Content Advisor/Ratings in the Options/Security section and which allows a user to enter and store a high level content specification. Future versions of the INTERNET EXPLORER will have the ability to send the content specification (248) to a content server as part of HTTP requests. Those skilled in the art will appreciate that there are many different other ways of creating a content specification (248) within the spirit and scope of the present invention.

In the following, examples of PicsRule-1.0 format content specifications for communication to the content server (203) are described. The URL of the rules language extension supporting server content modification is specified in the reqExtension statement "http://www.w3.org/Customization.html," and the URL of the rating service is "http://labelbureau.coolness.org/ratings/V1.html" (having an abbreviated or shortname "Cool"). The content specifications are given in the RejectUnless, RejectIf and AcceptIf clauses in the Policy statement. Although many more are possible, for ease of explanation, a two dimensional content specification (248) is considered: (i) a region-based appropriateness specification, i.e., CentralAmericaAppropriateness; and (ii) a content specification (248) based on adult content, i.e., Nudity. The Alteration Transmit extension clause indicates whether the content server should merge the control specification (237) with the video frame (Merged "true") or allow the merge to be performed at the client or some intermediate node (Merged "false"). The parameter clause, alterationPercentReturn true, indicates that the percent of video altered is to be reported back to the client (209).

Case A—request a video (video41) meeting a content specification:
GET video41 HTTP/1.1
Protocol-Request: {PICS-1.1 {params full {alterationPercentReturn true} }}
PicsRule:
  (PicsRule-1.0
    (
    reqExtension ("http://www.w3.org/Customization.html")
    ServiceInfo (
      name "http://www.coolness.org/ratings/V1.html"
      shortname "Cool"
      bureauURL "http://labelbureau.coolness.org/Ratings")
    Policy (RejectUnless "(Cool.CentralAmericaAppropriateness)")
    Policy (AcceptIf "((((Cool.CentralAmericaAppropriateness>0) and (Cool.Nudity<3)) and (PICS.AlterationPercentMax<20))")
    Policy (RejectIf "otherwise")
    AlterationTransmit (Merged "true")
  ))

Here, by way of example only, that the server (230) receiving the above content request and content specification (248) has four different versions of video41 (as indicated by the table below): video41-0-0; video41-1-4; video41-1-1; and video41-1-2; also that there may also be a separate entry identifying a fuzz-ball track, mask-41-1-4-3 (representing the control specification 380) based on video41-1-4. In the table below, the server content file column identifies a given version of the video; the type column indicates the type of the file where B represents an alternative video copy and M represents a fuzz ball track (337); examples of values for the Central American Appropriateness, and Nudity content specifications, and a percentage of content altered or masked (Altered Percentage) are provided in the in the 3rd, 4th, and 5th columns, respectively. To illustrate how a V-label (392) and O-label (396) can be specified under PICS, the corresponding labels for the cases of video41-0-0, and mask-41-1-4-3, where "1 r" represents a label rating are:
(video41-0-0) V-label: 1 r(CentralAmericaAppropriateness 0 Nudity 0 Pct 30); and
(mask-41-1-4-3) O-Label: 1 r(CentralAmericaAppropriateness 1 Nudity 0 Pct 5)

| server content file | type | Central America Appropriateness | Nudity | Altered Percentage |
|---|---|---|---|---|
| video41-0-0 | B | 0 | 0 | 30 |
| video41-1-4 | B | 1 | 4 | 0 |
| video41-1-1 | B | 1 | 1 | 22 |
| video41-1-2 | B | 1 | 2 | 9 |
| mask41-1-4-3 | M | 1 | 0 | 5 |

In this case, the content server (203) determines that it has a version of the requested movie (video41-1-2) which satisfies the client (209) content specification (248) ((Cool.CentralAmericaAppropriateness>0) and (Cool.Nudity<3) and (PICS.AlterationPercentMax<20)). Thus, video41-1-2 should be sent to the client (209). The HTTP response header includes the PICS-Alteration-Percent (9%).

The following example is similar to Case A except that a check request (FIG. 4, step 410), represented by the GET check&url=video41 HTTP/1.1 stetement, is first sent from the client (209) to the video server to find out whether the content specification (248) can be met. Again, the PICS Profile language, known as PICS Rule-1.0, is preferably used.

Case A1—Check if a Video is Available Meeting a Content Specification
GET check&url=video41 HTTP/1.1
Protocol-Request: {PICS-1.1 {params full {alterationPercentReturn true} }}
PicsRule:
  (PicsRule-1.0
    (
    reqExtension ("http://www.w3.org/Customization.html")
    ServiceInfo (
      name "http://www.coolness.org/ratings/V1.html"

shortname "Cool"
bureauURL "http://labelbureau.coolness.org/Ratings")
Policy (RejectUnless "(Cool.CentralAmericaAppropriateness)")
Policy (AcceptIf "(((Cool.CentralAmericaAppropriateness>0) and (Cool.Nudity<3))
and (PICS.AlterationPercentMax<20))")
Policy (RejectIf "otherwise")
Alteration Transmit (Merged "true")
) )
HTTP response codes:
200 - video is available
404 - video not available As for Case A, a version satisfying the content specification (248) is found, and the HTTP "200" response code is returned to the client. The HTTP response header also includes the PICS-Alteration-Percent.

In the next example, a mask request (FIG. 9, step 935) is sent to a mask provider (205) with a content specification (248) for a control specification (237) which can be used to modify the content to meet the content specification (248). Again, the PICS Profile language, known as PICS Rule-1.0, is used. An example of a URL of a video is "http://video.owner.com/videos/video41." This is encoded as "http%3A%2F%2Fvideo.owner.com%2Fvideos%2Fvideo41" in the example below for the value of the URL parameter in the Get mask request. A mask checking request to determine if the content specification (248) can be provided by the mask provider (205) is similarly composed with the "Get mask" replaced by "Get check."

Case A2-Request for a Mask Fom a Mask Provider
GET mask&url= "http%3A%2F%2Fvideo.owner.com%2Fvideos%2Fvideo41"HTTP/1.1
Protocol-Request: {PICS-1.1 {params full {alterationPercentReturn true} }}
PicsRule:
(PicsRule-1.0
(
reqExtension ("http://www.w3.org/Customization.html")
ServiceInfo (
name "http://www.coolness.org/ratings/V1.html"
shortname "Cool"
bureauURL "http://labelbureau.coolness.org/Ratings")
Policy (RejectUnless "(Cool.CentralAmericaAppropriateness)")
Policy (AcceptIf" (((Cool.CentralAmericaAppropriateness>0) and (Cool.Nudity<3))
and (PICS.AlterationPercentMax<8))")
Policy (RejectIf "otherwise")
Alteration Transmit (Merged "true")
))
HTTP response codes:
200 - mask returned
404 - mask not available Here, there is a control specification (237) mask41-1-4-3, which can modify the content to meet the content specification ((Cool.CentralAmericaAppropriateness>0) and (Cool.Nudity<3)) and (PICS.AlterationPercentMax<8))) and the control specification (237) can be sent to the content server (203). The HTTP response header includes the PICS-Alteration-Percent.

Case B

In Case B, a client 209 communicates a video request the content server (203) with a content specification (given below), wherein a video stream (390) and a fuzz-ball track (337) are returned to the client 209 by indicating in the AlterationTransmit clause that the fuzz-ball should not be applied at the server end, i.e. it is to be done at the client node.
GET video42 HTTP/1.1
Protocol-Request: {PICS-1.1 {params full {alterationPercentReturn true }}
PicsRule:
(PicsRule-1.0
(
ServiceInfo (
name "http://www.coolness.org/ratings/V1.html"
shortname "Cool"
bureauURL "http://labelbureau.coolness.org/Ratings")
Policy (RejectUnless "(Cool.CentralAmericaAppropriateness)")
Policy (AcceptIf "(((Cool.CentralAmericaAppropriateness>0) and (Cool.Nudity<3))")
Policy (RejectIf "otherwise")
Alteration Transmit (Merged "false")
))

By way of example only, assume here that the content server has two different video versions: video42-0-0, and video42-1-4; and that there is also a control specification (337), mask42-1-4-1 based on video 42. This is summarized below.

| server content | type | Central America Appropriateness | Nudity | Percent Altered |
|---|---|---|---|---|
| video42-0-0 | B | 0 | 0 | N/A |
| video42-1-4 | B | 1 | 4 | N/A |
| vmask42-1-4-1 | M | 1 | 1 | 7 |

In this case, there is no unmodified version which meets the content specification ((Cool.CentralAmericaAppropriateness>0) and (Cool.Nudity<3)). However, the mask42-1-4-1 can be applied to video42-1-4 and the resulting content will meet the specification. Since the Alteration Transmit clause indicates (Merged "false") the video42-1-4 should be sent along with the vmask42-1-4-1. Since the Protocol-Request statement includes a {alterationPercentReturn true }} clause, the response header will indicate PICS-Alternation-Percent: 7.

Note that there are various alternative implementations and extensions to the object labeling or content specification (248) can be used within the spirit and scope of the present invention. For example, other protocols such as RTSP and MPEG, can be also be used to provide a content specification (248).

A control specification (237) indicates how the stream content should be modified. It provides instructions on showing the frames or groups of frames of the multimedia streams, specifies blocking, omissions, and overlays. As discussed, one type of control specification (237) is a separate fuzz-ball track (337). Another is an edit-decision list, which indicates which frames to modify or replace.

According to the present invention, the control specification (237) can be flexibly provided at each frame, group of frames or a video header. A control specification at a level of group of frames or the video header can be time-based so that the specific frame can be identified by the timing information. In a preferred embodiment, the masking/modification of the multimedia stream content is presented in terms of real-time video stream delivery, but the same concept is applicable to any other type of multimedia stream which may include multiple streams of video and/or audio.

Those skilled in the art will also appreciate that although the control specification has been described as a separate stream or track, that there are various alternative ways to provide an object-level control specification. For example, each frame of a video can include a rich PICS label, such as the F-label (394), to specify the necessary control information associated with that frame:

frame
   PICS label "F-Label"
00001
   (PICS-1.1 "http://www.coolness.org/ratings/V1.html"lr
   (CentralAmericaAppropriateness 1 Nudity 2 Nudity1x
   0 Nudity1y 0 Nudity1h 480 Nudity1w 640))
00002
   (PICS-1.1 "http://www.coolness.org/ratings/V1.html"lr
   (CentralAmericaAppropriateness 1 Nudity 3
Nudity3x 206 Nudity3y 113 Nudity3h 100 Nudity3w 109
Nudity1x 31 Nudity1y 199 Nudity1h 294 Nudity1w 307))

Here, Nudity1x and Nudity1y specify the location (x and y coordinates, which for frame 00001 are 0 and 0, respectively) and Nudity1h and Nudity1w specify the size (height and weight, which for frame 0001 are 480 and 640, respectively) of the fuzz ball to achieve a nudity level value of 1. Similarly, Nudity3x and Nudity3y specify the location (x and y coordinate) and Nudity3h and Nudiy3y specify the size (height and weight) of the fuzz ball to achieve a nudity level value of 3.

For frame 00001, which has a Nudity level value of 2 and CentralAmericaAppropriateness value of 1, there is one fuzz-ball specified which, when applied, can achieve a Nudity level value of 1. For frame 00002 which has a Nudity level value of 3 and CentralAmericaAppropriateness value of 1, there are two fuzz-balls specified: one provides a Nudity level value of 3; and the other provides a Nudity level value of 1.

If the request is not for a multicast stream, then the server can modify the content based on the control specification (237) and the client (209) content specification (248) and transmit the modified stream (390) to the requesting client. A value can be computed to return the PICS-Alteration-Percent, using the formula: (number-of-frames-with-fuzzball/total-number-of-frames)×100. For the multicast case, the client (209) can modify the content using the control specification (237) to satisfy the content specification (248). Viewers with different content specifications (248) will modify the content differently using an appropriate control specification (237).

Those skilled in the art will also appreciate that a fuzz ball can have any shape. Instead of being a rectangle, it can take the form of a polygon or circle.

Figure 4:
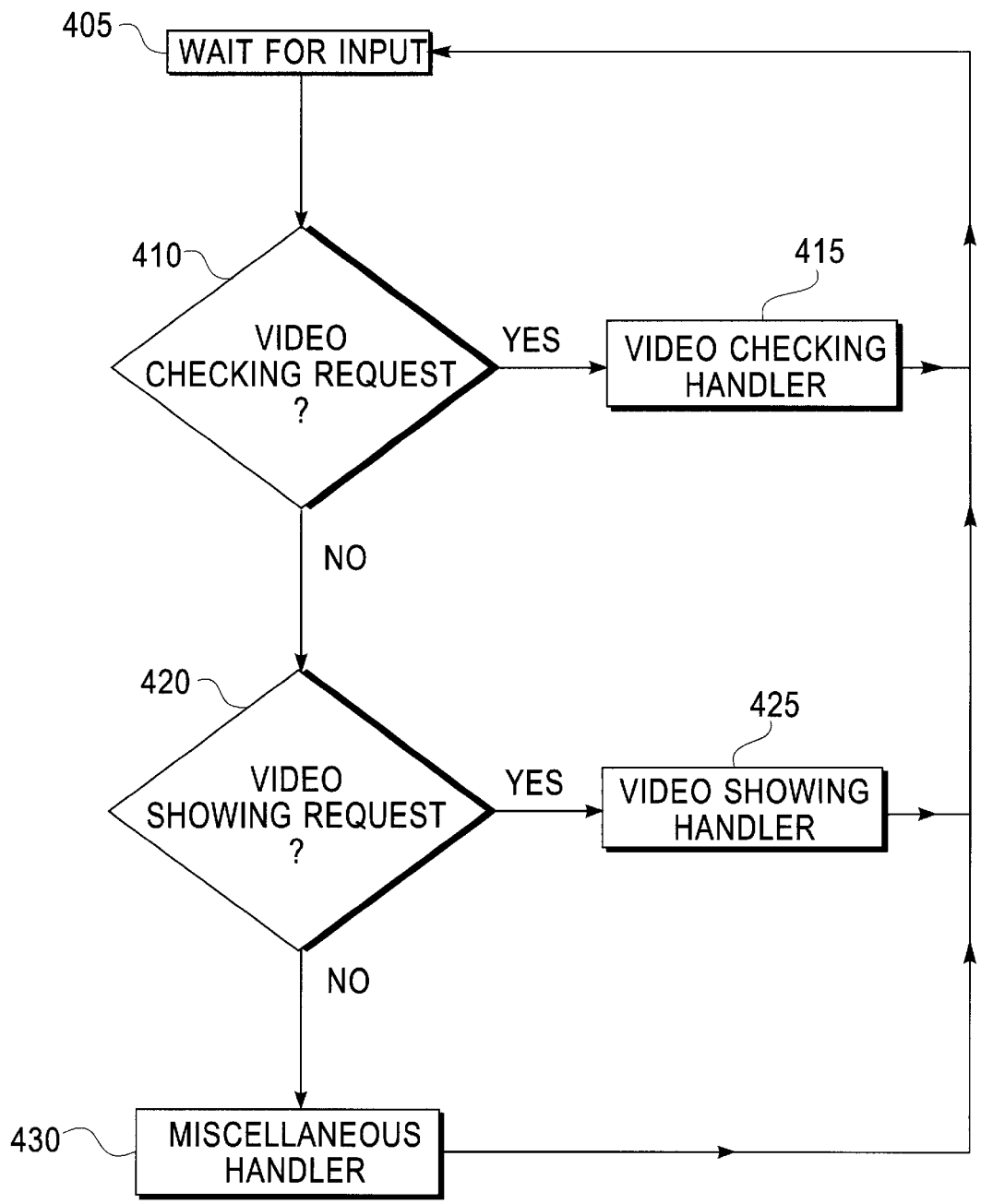
FIG. 4 is an example of the content server logic of FIG. 2.

FIG. 4 depicts an example of the content server logic (268). As depicted, in step 405, the content server (203) waits for input. In step 410, depending upon the input received, different actions will be taken. If the input received is a video checking request, the video checking handler (267) is invoked in step 415. The video checking handler determines whether there is a version of the requested video that can be modified or masked to satisfy the content specification. A detailed example of the video checking handler will be described with reference to FIG. 5. In step 420, if the input received is a video showing request, the video showing handler (269) is invoked, in step 425. The video showing handler delivers the video stream based on the content specification. If the video requested has multiple versions, the video showing handler checks whether any version satisfies the content specification (248). A detailed example of the video showing handler (269) will be described with reference to FIG. 6. For other types of inputs, which are not the focus of the present invention (such as a conventional HTTP request for a Web document, or an FTP request) an appropriate miscellaneous handler (430) can be invoked.

Figure 5:
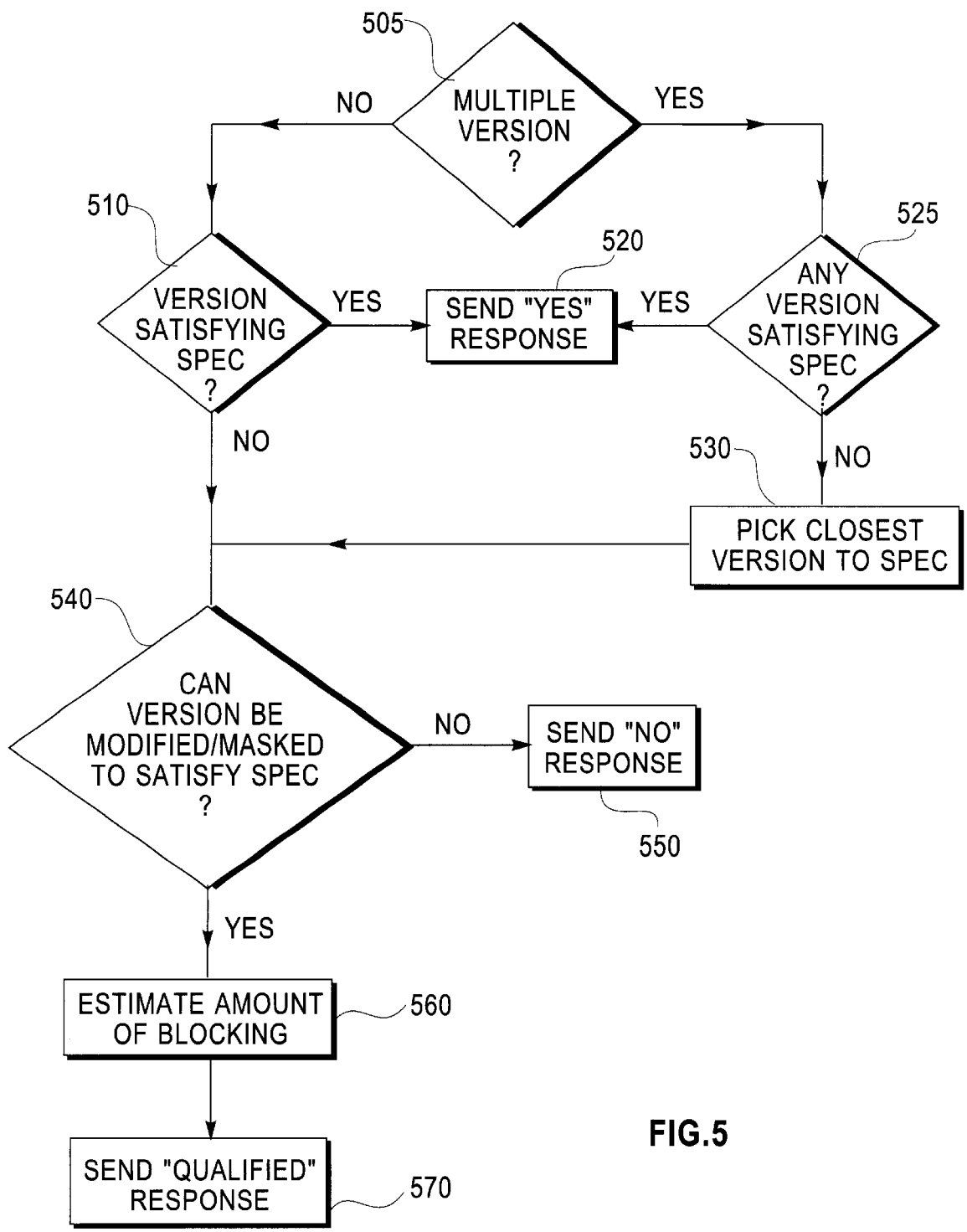
FIG. 5 is an example of the video checking handler of the server.

FIG. 5 depicts an example of the video checking handler (267). The video checking handler determines if there is a version of the requested video that can be modified or masked to satisfy the content specification (248). In step 505, if the video requested has multiple versions, it is determined if any version satisfies the content specification (248), in step 525. If true, a "yes" response can be sent to the client (209), in step 520. Otherwise, in step 530, the version closest to the content specification (248) is selected. In the preferred embodiment, the content server maintains for each video stored in the server mask information on the available control specifications (237), the content specification (248) achievable via each control specification (237) (i.e., the O-label 396), and an estimate on the amount of information blocked by each control specification (237). In step 540, the server (203) determines, based on the control specification (237) information, if the version can be modified or masked to satisfy the content specification (248). If so, in step 560, an estimate of the amount of video that needs to be filtered or blocked out can be obtained. This estimate (which is an upper bound) can be obtained by adding the amount of information blocked by each fuzz-ball track that needs to be applied. In step 570, a "qualified" response (which is included in a HTTP response header to indicate the PICS alteration percent) is sent back to the requester indicating the amount that will be blocked out. If, in step 505, there is only a single version of the video available in the server, in step 510 it is checked whether this version satisfies the content specification (248). If true, a "yes" response can be sent to the client (209), in step 520. If not, processing continues at step 540, as above.

Figure 6:
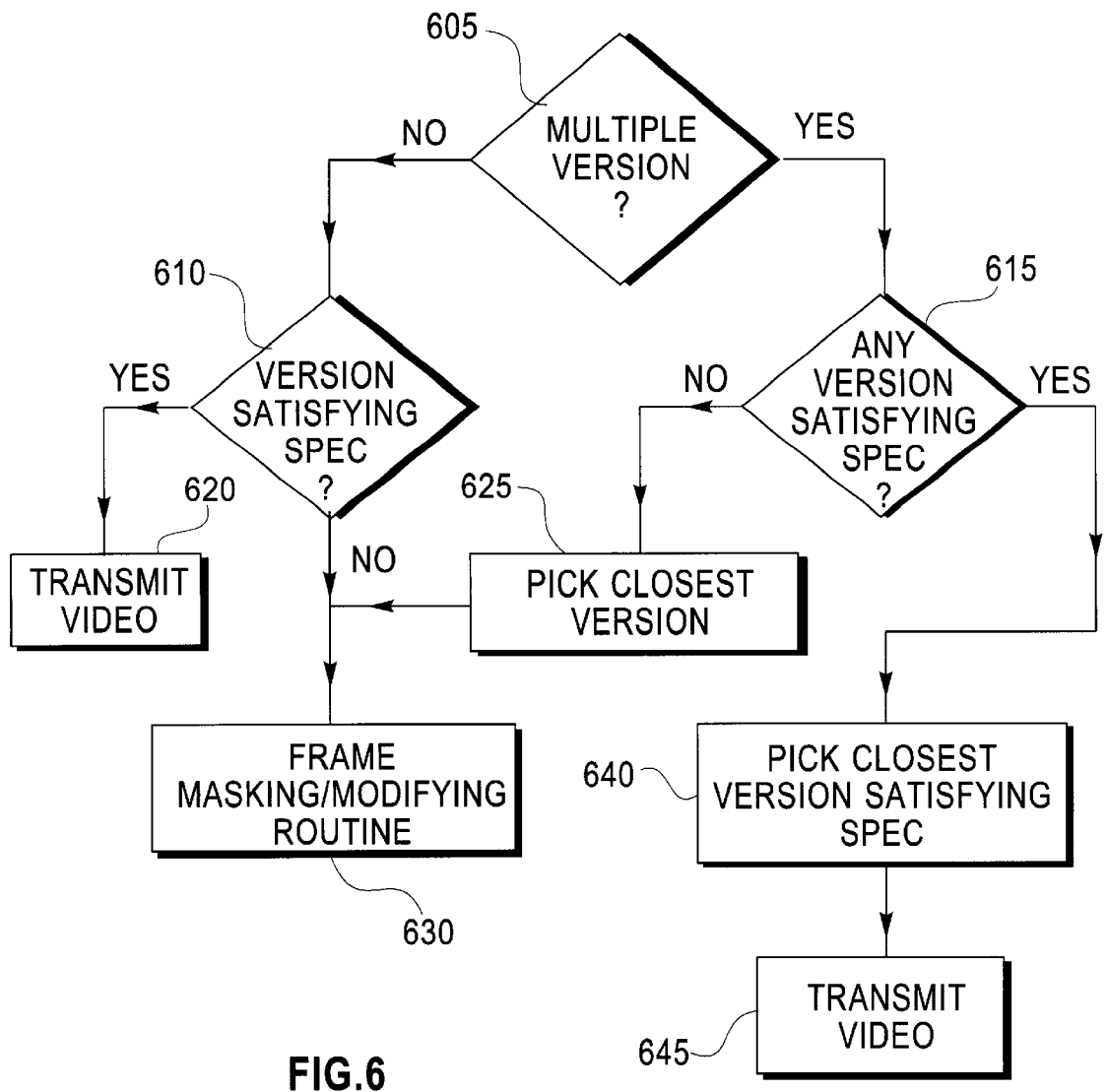
FIG. 6 is an example of the video showing handler of FIG. 5.

FIG. 6 depicts an example of the video showing handler (269). The video showing handler delivers the video stream based on the content specification (248). In step 605, if the video requested has multiple versions, it is checked whether version satisfies the content specification, in step 615. If so, in step 640 the version closest to the content specification is selected. In step 645, the selected version is transmitted to the client (209). In step 615, if no version satisfies the content specification, the closest version is selected, in step 625. In step 630, the frame masking/modification routine is invoked. A detailed example of the frame masking/modification routine will be described with reference to FIG. 7. If there is only a single version of the video in the server, in step 605, it is checked whether this version satisfies the user specification, in step 610. If so, in step 620 the video is transmitted to the client.

Figure 7:
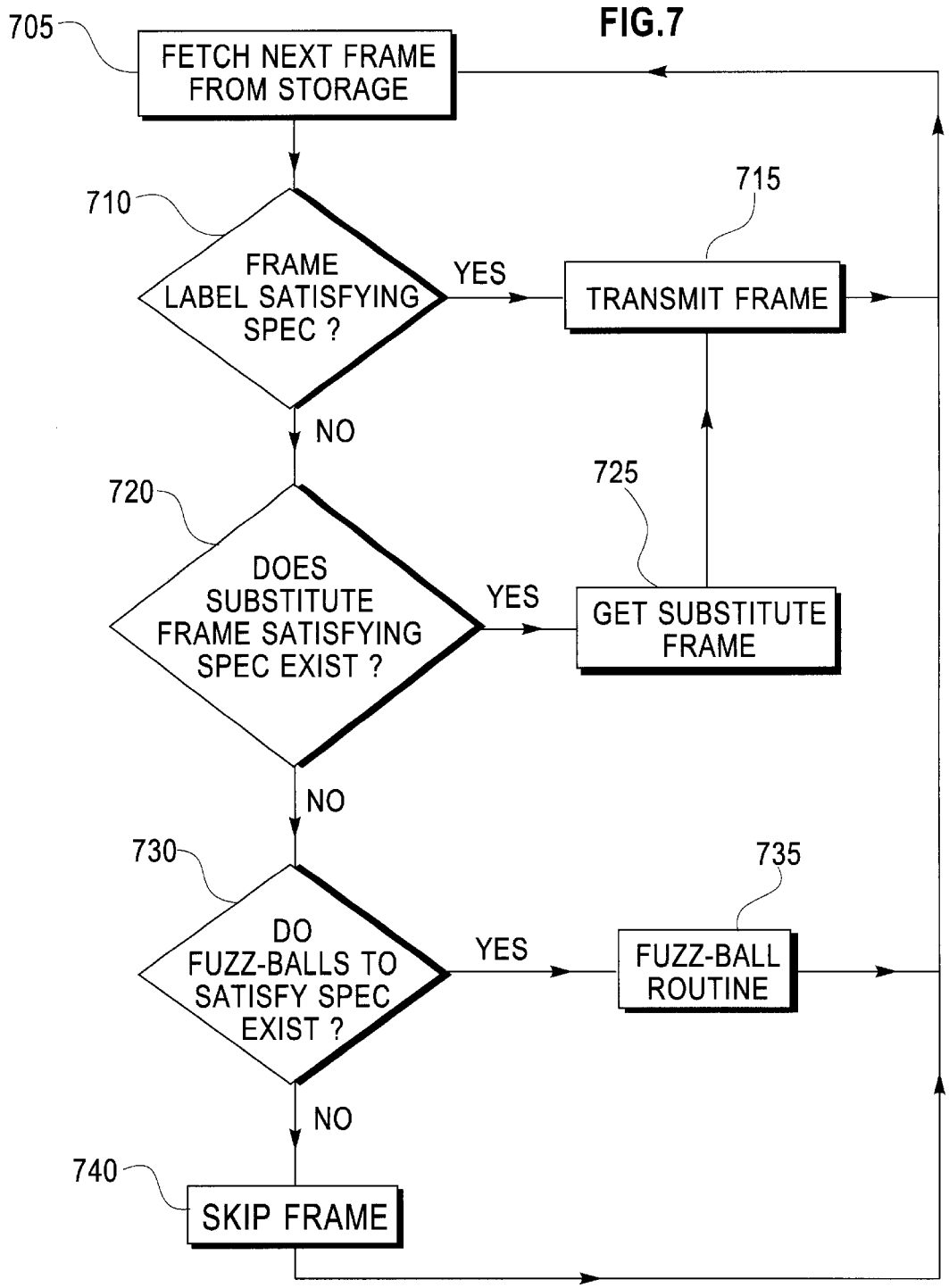
FIG. 7 is an example of the frame masking/modifying routine of FIG. 6.

FIG. 7 depicts an example of the frame masking/modification routine (FIG. 6, step 630). The frame masking/modification routine can modify, mask or merge/add fuzz-ball tracks for a video. As an objects, for example in a video frame, are masked or modified the category value of the V-label (392) can be updated to reflect the resulting change in the current content rating of the video. For example, if a video with a V-label (392) violence level value of 5 is overlaid with a fuzz-ball track (337) having an O-label (396) violence level value of 2, the resultant video can have a V-label violence level value of 2. Alternatively, as descibed above, the F-label (394) can include the content specification (248) as part of the multimedia stream without requiring a separate fuzz ball track (337). The remainder of this example will assume that the multimedia stream includes F-labels (394) with each frame of the multimedia stream. In step 705, a next frame of the video is fetched from storage (265). In step 710, if the frame label (394) (F-label) satisfies the content specification (248), the frame is transmitted to the client (209), in step 715. Otherwise, in step 720, it is checked whether a substitute frame exists satisfying the content specification. If so, in step 725, the substitute frame is fetched. Otherwise, in step 730, it is checked whether there is one or more fuzz-ball tracks (337), based on their O-labels (396), that can be applied to satisfy the content specification. This can be accomplished by comparing the lowest category value of each dimension among all fuzz-ball tracks, with the content specification (248). If the lowest category value is less than the content specification (248) on each dimension, there is a set of fuzz-ball tracks which satisfy the content specification. If so, in step 735, the fuzz-ball routine is invoked. An example of the fuzz-ball routine will be described with reference to FIG. 8. In step 730, if a fuzz-ball track (337) is not available, a blank frame can be sent, in step 740.

Figure 8:
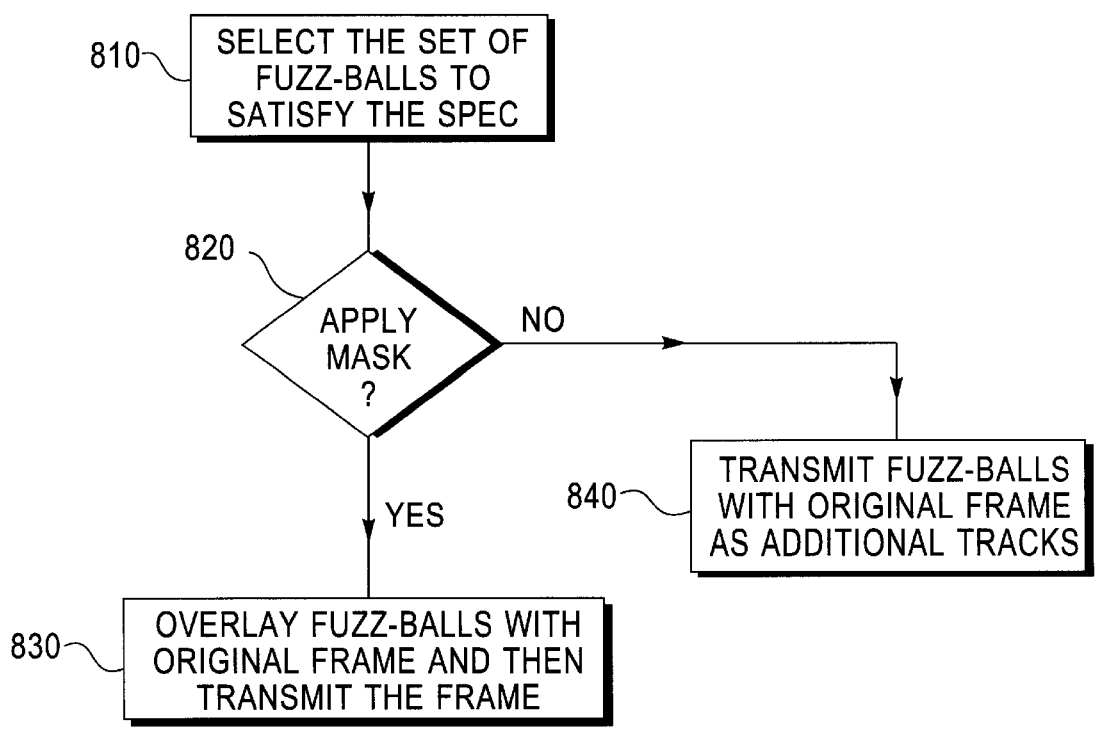
FIG. 8 is an example of the fuzz-ball routine of FIG. 7.

FIG. 8 depicts an example of the fuzz-ball routine 735. In step 810, the set of fuzz-balls (237) that satisfy the multidimensional content specification (248) (with the least amount of blocking) are selected based on their labels (i.e. the O-labels). For example, consider the case that the video has a violence level value of 7 and nudity level value of 3 as specified in its V-label (392), and the content specification (248) prescribes a violence level value of 4 with no constraint on the nudity level. Assume that there are 4 fuzz-ball tracks available with the following O-labels 396: track one with violence level value of 4 and nudity level value of 3, track two with violence level value of 3 and nudity level value of 3, track three with a nudity level value of 2 and a violence level value of 7, and track 4 with a nudity level value of 1 and a violence level value of 7. Fuzz ball track one will be selected as it satisfies the requirement with the least amount of blocking. In step 820, if the fuzz-ball track (337) is to be applied by the server, as indicated in the content specification (248), the fuzz-balls (397) can be superimposed on the corresponding video frame before it is transmitted, in step 830. Otherwise, the fuzz-ball track is transmitted with the original frame as additional tracks (337), in step 840. For example, for a multicast video, different viewers may have different content specifications. It is thus more appropriate for the content server (203) to transmit the various fuzz-ball tracks (337) (as a separate track) with the video transmission and let each client (209) select and apply the appropriate fuzz-ball track (337). In another example, an organization (such as a school or corporation) and individual users or subgroups within the organization may each have its own content specification (248). Fuzz-balls (397) can overlap due to multiple fuzz-ball tracks (337) on the same dimension. Again, it is more efficient for the content server (203) to separately transmit the fuzz-ball tracks (337) with the transmissions and let each intermediate node such as a gateway or proxy server (280) and client (209) station apply the appropriate fuzz-ball track (337) to modify the content as the video passes through.

Figure 9:
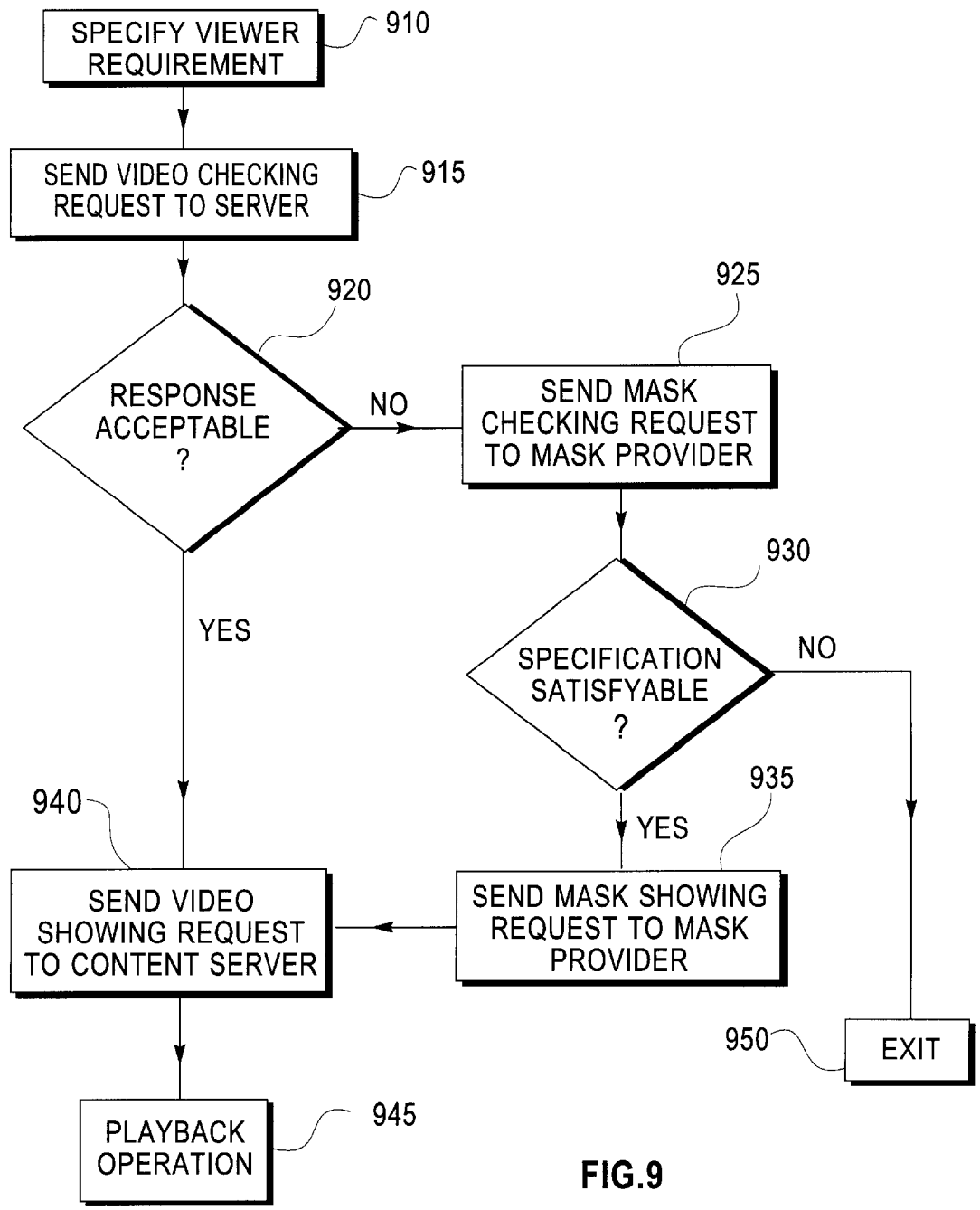
FIG. 9 is an example of the client logic of FIG. 2.

FIG. 9 depicts an example of the client logic (249). As depicted, in step 910, the client (209) specifies in its video request with its requirement, such as a medium violence level and a low nudity level. In the preferred embodiment, the specification format uses the PICS Profile language, known as PICS Rule-1.0. Normally, for each category in the rating scheme, the client (209) can specify the maximum level desired. In step 915, a video checking request is sent to the content server to see whether the content specification (248) can be satisfied. In a preferred embodiment, the response can be either "yes," such a version exists, or a qualified response, e.g., a version can be delivered, but with say 20% blocked out as described with respect to FIG. 5. In step 920, if the response is deemed acceptable, in step 940 a video showing request is sent to the content server to request delivery of the video. In step 945, the video playback operation (247) will be invoked to receive and play the video. A detailed example of the playback operation will be described with reference to FIG. 10. In step 920, if the response to the content specification (248) is not acceptable, the client (209) can still query third party mask providers as in step 925, where a mask checking request indicating the types of masks that are needed for the content specification (248) is sent to a mask provider. In the preferred embodiment, the specification format uses the PICS Profile language, known as PICS Rule-1.0. Normally for each category in the rating scheme, the client (209) can specify in the mask checking request the level desired for the control specification (237) to provide. For example, if a video has a violence level value of 5 and nudity level value of 7 and the content specification (248) prescribes a violence level value of 3 and nudity level value of 2, a mask checking request for a violence level value of 3 and nudity level value of 2 is sent to the mask provider to find out whether there are control specifications (237) to satisfy such a content specification (248). In step 930, if the response from the mask provider indicates that the specification can be satisfied, in step 935 the mask showing request is sent to the mask provider to get the control specification (237) or fuzz-ball track (337).

Consider an example, where a client (209) specifies with the video request, a content specification (248) including a violence level value of 3 and a nudity level value of 2, and the requested video has a rating of violence level value of 5 and nudity level value of 4 as indicated by its V-label. Since the unmodified video fails both the violence and nudity specifications as indicated by the V-label of the video, the client (209) needs to have appropriate control specifications (237) applied to modify the video content to satisfy the content specification. That is to say the client (209) needs to obtain one or more fuzz-ball tracks (337) with an appropriate O-label (396) such that the minimum category values among the fuzz-ball tracks for the nudity and violence levels satisfies the content specification. Assume that the following two fuzz ball tracks are available: a first fuzz-ball track has a violence level value of 3 and nudity level value of 4 as indicated by its O-label; and a second fuzz-ball track has a violence level value of 5 and a nudity level value of 2. These fuzz-ball tracks can either be supplied by the content provider or by third party mask providers. In fact, the two fuzz-ball tracks can come from different providers. Here, assume that the fuzz-ball tracks are available from one of the third party mask providers (205). The client (209) can send a mask checking request to find out whether the mask provider has one or more fuzz-ball tracks (337) to satisfy a violence level value of 3 and a nudity level value of 2 for the requested video. The mask provider in this case will return a positive response as the requirement can be satisfied with the two fuzz ball tracks described above. The client (209) then sends a request to the content provider for the video and also a request to the mask provider for the two fuzz-ball tracks. Alternately, the content provide can interact with the mask provider. By overlaying both of these fuzz-ball tracks (337) with the video, a violence level value of 3 and nudity level value of 2 will be achieved. This overlay can be done on a per-frame basis as depicted in FIG. 3a, by overlaying on each frame both the fuzz-ball for masking violence from the first fuzz-ball track and the fuzz-ball for masking nudity from the second fuzz-ball track corresponding to the frame. An example of the client playback will be described with reference to FIG. 10.

Figure 10:
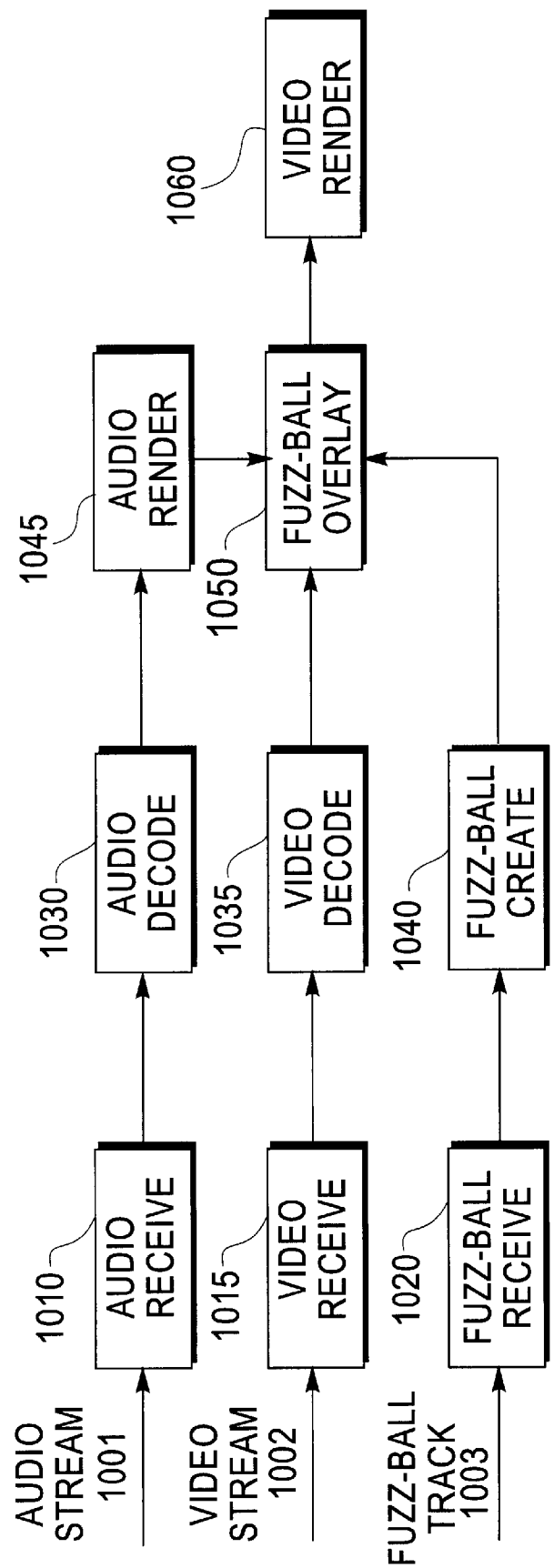
FIG. 10 is an example of the client playback operation.

FIG. 10 depicts an example block diagram for the client playback operation (247). By way of overview, multiple streams such as video stream (1002), an associated audio stream (1001), and the fuzz-ball track (1003) (which may come from a different source, e.g., the mask provider (205), arrive at the client station. Although only a single audio, video, and fuzz-ball track are shown, for simplicity of presentation, there can be a one or more of each of the tracks. In particular there can also be multiple fuzz-ball tracks associated with a single multimedia content. The multimedia streams will be received and decoded or processed by the client as indicated in steps 1015 and 1035 for the video, 1010 and 1030 for the audio and 1020 and 1040 for the fuzz-ball, respectively. The fuzz-ball is created in step 1040 and overlaid on the appropriate video frame in step 1050. The audio rendering in step 1045 is combined with the fuzz-ball overlay based on the timing or synchronization information embedded in the stream to provide the final video rendering, in step 1060. Even more complex masking techniques for overlaying two different video streams e.g., where the overlaid stream is actually another video, are well known in the art. See, for example U.S. Pat. No. 5,257,113, issued Oct. 26, 1993 by Chen et al., entitled "Mixing and Playback of JPEG Compressed Packet Videos," which is hereby incorporated by reference in its entirety.

For example, consider a video clip consisting of a sequence of frames numbered from 1 to n. To mask the video sequence, a fuzz-ball (237) is created which overlays the video sequence at specific locations in each frame. For simplicity, assume that the fuzz-ball is simply a black rectangle. Recall from FIG. 3a that a fuzz-ball track may be represented as a list of frame numbers (or time-stamps) and the location coordinates (location within the frame) and size of the fuzz-ball.

Referring again to FIG. 10, an incoming video is received in step 1015, from the network or a file. In step 1035, the video is decoded and each video frame is passed to the fuzz-ball overlay module (as will be discussed in more detail with reference to FIG. 8), in step 1050 as a bit map (matrix of integer values) along with a frame number. Meanwhile, the incoming fuzz-ball track is received in step 1020 from the network or a file, and passed to the fuzz-ball creation module, in step 1040, where each fuzz-ball is created as a rectangular matrix of integer values (the integer value is the color of the fuzz-ball, in this case the integer value corresponding to black). This fuzz-ball matrix is also passed to the fuzz-ball overlay module in step 1050 along with the fuzz-ball frame number and location coordinates (FIG. 3). In step 1050, the fuzz-ball frame number Z is compared to the current video frame number V. If Z>V, then in step 1060, the video frame is sent unmodified to the video render module to be displayed. In step 1050, the next video frame is retrieved by the fuzz-ball overlay module (sent by the video decode module in step 1035). If Z<V, then the next fuzz-ball is retrieved by the fuzz-ball overlay module in step 1050 from the fuzz-ball create module (sent in step 1040). If Z=V, then the video frame integer matrix is overwritten with the fuzz-ball integer matrix at the location within the video frame specified by the fuzz-ball location coordinates. Then the modified video frame is passed to the video render module, in step 1060 to be rendered in any one of many conventional ways known to those skilled in the art. The process continues as above for the remainder of the video, with the next video frame being retrieved by the fuzz-ball overlay module, in step 1050, (sent by the video decode module in step 1035), and the next fuzz-ball is retrieved from the fuzz-ball create module (sent in step 1040).

FIG. 11 depicts an example of a mask provider logic having features of the present invention. As depicted, in step 1110, the mask provider waits for input. In step 1115, depending upon the input received, different actions will be taken. If the input received is a mask checking request, in step 1125 it is determined if a fuzz ball track (337) exists which can satisfy the content specification (248). If so, in step 1150 a "yes" response is sent. Otherwise, a "no" response is sent at step 1160. In step 1120, if the input received is a mask showing request, the requested fuzz-ball tracks are delivered in step 1140. For other types of inputs, which are not the focus of the present invention (such as requests for insert/delete/update control specifications (237)) an appropriate miscellaneous handler (1130) can be invoked.

Those skilled in the art will appreciate that the method for masking or modifying multimedia stream also works in a heterogeneous environment, where some of the nodes are conventional content servers, proxies or client stations which do not understand the masking protocol in the invention and do not participate in the masking/filtering operations. For example, if the content server is a conventional server, the client (209) can work directly with a mask provider to get the fuzz-ball track and perform the masking operation at the client. In other words, steps 915 and 920 are bypassed to go to step 925 from step 910 in FIG. 9. For a conventional client station which cannot perform the masking operation, either an intermediate proxy or the content server can perform the masking operation. In fact, in an organization such as a school or corporation, a proxy node (280) may perform or request masking operations based on the organization's (intranet-wide) policy, transparently to the client stations which may have no capability for performing or requesting any of the masking operations. In a proxy hierarchy, (FIG. 1) one or more proxies may select and apply its own masking criterion, and some may be conventional proxies which do not participate in the masking operation. On the other hand, each client station may also request or perform additional masking operations based on local requirements, independent of the proxies.

Those skilled in the art will also appreciate that the control specification (237) streams may contain video/audio other than visual or audio fuzz-balls. These might include visual captions or an audio translation in a particular language (such as Chinese, Spanish, etc.) requested in the PICS profile.

Thus, the present invention includes features which provide a dynamic, fine-grained means for masking or modifying identifiable objects in a video stream such as a portion of a video frame, or portion of the video stream, sample of audio, or substituting objects to satisfy a content specification (248). The dynamic content modification can be flexibly and/or sequentially performed either at the server (203), the proxy (280), the client (209), or a combination of these nodes collaboratively and furthermore does not require all of them to participate.

Those skilled in the art will appreciate that although the preferred embodiment is described in terms of the Internet using a novel adaptation of PICS, the present invention is not limited to such an environment. For example, it is well known in the art to transmit control signals during the vertical blanking interrupt (VBI) of a standard television broadcast. The majority of televisions today include a closed captioning controller which can be optimized through conventional software algorithms to decode any signals sent to the VBI of a television set. This controller is currently typically programmed for blocking satellite programs, on-screen programming, and closed captioning. This controller can also be adapted by software to comprise the more popularly known "V-chip" (mandated as part of the recently enacted Telecommunications Bill 652) for automatically blocking programs based on their ratings. A V-chip converter will also be available in the Fall of 1997 which can be used to enable televisions not having the necessary technology. According to the present invention, the controller or V-chip converter can be programmed by conventional means to provide the content specification (248). The functionality provided by the control specification such as the F-labels (394) can be transmitted during the VBI of the transmission and assuming there is sufficient processing power, the controller can perform an object-level content modification according to the control specification (237) and the content specification (249). Alternatively, additional processing power can be provided by a set top box version of the client (209), or the V-chip converter, as needed. In the case where the video stream (390) and control specification (237) are transmitted as two or more streams (FIG. 3a), the controller can be adapted to modify the content by functions analogous to that described for the V-label (392) and O-label (396) in the preferred embodiment.

The present invention is also not limited to a conventional frame oriented video stream transmission system. For example, the Moving Picture Coding Experts Group (MPEG) is a working group of ISO/IEC in charge of the development of international standards for compression, decompression, processing, and coded representation of moving pictures and/or audio. MPEG-2 decoders are contained in millions of set-top boxes and have assisted the satellite broadcast and cable television industries transition from analog to digital technology. A new standard, MPEG-4, is currently under development. The MPEG-4 standard will, inter alia provide: standardized ways represent audio, visual, or audiovisual content (called "audio/visual objects" or AVOs); combine primitive objects ("primitive AVOs") into compound audiovisual objects, for example as an audiovisual scene; multiplex and synchronize the data associated with AVOs for transport over networks to meet an appropriate quality of service; and interact with an audiovisual scene generated at the client end (see e.g., http://www.q-team.de/mpeg4/whatmpeg.htm). Thus, it should be understood that the "objects" of the present invention include objects which are identifiable and modifiable in a multimedia bit-stream, such as the AVOs of MPEG-4. Similarly, the MPEG-4 PC project is directed to a PC implementation including the creation of an authoring system for MPEG-4 (see e.g., http://www.q-team.de/mpeg4/contcrea.htm).

Now that a preferred embodiment of the present invention has been described, with alternatives, various modifications and improvements will occur to those of skill in the art. Thus, the detailed description should be understood as an example and not as a limitation. The proper scope of the invention is defined by the appended claims.

What is claimed is:

1. In a multimedia network including a multimedia stream, a method of modifying objects associated with content of the multimedia stream, comprising the steps of:
   transmitting a content request including a content specification from at least one of a user and a proxy to a remotely located server, wherein the content request includes a multidimensional content specification;
   requesting, from the remotely located server, a control specification from a control specification provider based on a comparison of the content request and the content of the multimedia stream;
   dynamically modifying in the proxy one or more objects on one or more dimensions of the multimedia stream based on the content specification and the control specification, said dynamically modifying further comprising the step of dynamically modifying a frame of a video according to multiple control specifications and the multidimensional content specification; and
   transmitting the modified multimedia stream from the proxy to the user.

2. The method of claim 1, wherein said dynamically modifying comprises the steps of:
   generating a first stream including the content;
   generating a second stream including the control specification for the content;
   receiving a request for the content including the content specification
   said dynamically modifying includes dynamically modifying the content of the first stream according to the control specification and the content specification; and
   transmitting the modified multimedia stream.

3. The method of claim 2, further comprising the steps of determining and notifying a content requester of a percentage of the content that would be modified according to the content specification, in response to said receiving.

4. The method of claim 2, further comprising the step of communicating to the requester a blocking indicator, without showing the video, when the percentage exceeds a threshold.

5. The method of claim 2, wherein the control specification includes a multidimensional control specification.

6. The method of claim 1, wherein the content includes video and wherein the control specification includes a fuzz ball specification, said step of dynamically modifying further comprising the steps of:
   generating the fuzz-ball specification corresponding to one or more content specifications; and
   receiving a request for the content including the content specification; and
   dynamically overlaying at least a part of a frame of the video based on the fuzz-ball specification and the content specification, in response to said receiving.

7. The method of claim 6, wherein the content specification and the control specification include a PICS protocol, said method further comprising the steps of:
   generating separate fuzz-ball specifications corresponding to different content specifications; and selecting a fuzz-ball specification based on a PICS specification.

8. The method of claim 6, wherein the content specification is time-based.

9. The method of claim 6, wherein said generating comprises the step of
   generating the fuzz-ball specififcation as one or more fuzz balls having a size, location, and temporal relation to a frame of the video.

10. The method of claim 6, further comprising the step of overlaying multiple fuzz ball specifications to meet the content specification.

11. The method of claim 1, said dynamically modifying further comprising the step of combining multiple content specifications covering one of multiple dimensions and rating systems.

12. The method of claim 11, wherein the content includes video, further comprising the step of overlaying multiple fuzz-ball filters, in response to said combining step.

13. The method of claim 1, wherein the content includes video, further comprising the step of dynamically modifying a frame of the video according to the multiple control specifications and the multidimensional content specification.

14. The method of claim 13, wherein the content includes video, said dynamically modifying the frame of the video further comprising the steps of masking a frame of the video according to the multiple control specifications and the multidimensional content specification.

15. The method of claim 13, wherein said dynamically modifying further comprises the step of dynamically modifying the frame of the video at one or more of: a content server, a client, a set top box; and a proxy node.

16. The method of claim 1, further comprising the step of communicating one of the content specifications and the control specification according to one of: a PICS protocol; a RSTP protocol; and an MPEG protocol.

17. The method of claim 16, wherein the content includes video and the PICS protocol includes a plurality of PICS labels, further comprising the steps of:

said communicating including communicating a V label indicating a content rating of a video and an overlay label to indicate the effect of a modification to the content rating; and updating a category value of the V label, in response to said dynamically modifying.

18. The method of claim 1, wherein the network comprises a World Wide Web including a hierarchy of servers, further comprising the step of: an intermediate proxy server modifying content specifications for an outgoing content request.

19. The method of claim 18, wherein the hierarchy includes a heterogeneous proxy hierarchy wherein said modifying is not performed by the client or all servers in the hierarchy.

20. The method of claim 1, further comprising the steps of:

multicasting a single multimedia stream to multiple requesters; and rendering the video by said requesters, at least two of said requesters rendering the video according to different content specifications.

21. The method of claim 20, further comprising the steps of: generating one or more separate fuzz ball specifications for the different content specifications; and selecting one or more fuzz ball specifications according to a PICS protocol.

22. The method of claim 1, said dynamically modifying further comprising the step of dynamically bypassing, masking, blocking and substituting objects.

23. The method of claim 22, wherein said content includes video, further comprising the step of substituting one or more frames or segments of the video with one or more alternative frames or segments.

24. The method of claim 22 wherein the content comprises video, further comprising the step of skipping one of video frames and video segments based on the control specification and the content specification.

25. The method of claim 22, wherein the content includes video, further comprising one or more steps of: masking or blocking some portion of one of a video frame and a video stream at one of a server, proxy, set top box, and client.

26. The method of claim 1, said dynamically modifying further comprising the step of generating a second stream including the control specification for the content; wherein the control specification is generated at one of the video header, a group of frames of the video, and an individual frame level.

27. The method of claim 1, further comprising the steps of communicating the control specification and the content as a single stream.

28. The method of claim 27, wherein the content includes video and wherein said step of communicating comprises the step of communicating the control specification during the vertical blanking interrupt of the multimedia stream.

29. The method of claim 27, wherein said step of communicating comprises the step of associating a frame label with one or more frames of the video.

30. The method of claim 1, further comprising the steps of:

multicasting a single multimedia stream to multiple requesters; and each requester rendering the video using a at least two different content specifications.

31. The method of claim 1, wherein the objects include one of an identifiable object in the multimedia stream; at least a portion of a frame of video; and a sample of audio.

32. The method according to claim 1, wherein the transmitting step transmits the multimedia stream through at least one proxy.

33. A computer program product comprising:

a computer usable medium having computer readable program code means embodied therein for modifying objects associated with the content of a multimedia stream, the computer readable program code means in said computer program product comprising:

computer readable program code means for causing the computer to effect, receiving a content request, by a remotely located server, including a content specification from at least one of a user and a proxy, wherein the content request includes a multidimensional content specification;

computer readable program code means for causing the computer to effect, requesting, from the remotely located server, a control specification from a control specification provider based on a comparison of the content request and the content of the multimedia stream;

computer readable program code means for causing the computer to effect, dynamically modifying at the proxy one or more objects on one or more dimensions of the multimedia stream based on the content specification and the control specification, said dynamically modifying further comprising the step of dynamically modifying a frame of a video according to multiple control specifications and the multidimensional content specification; and computer readable program code means for causing the computer to effect, transmitting the modified multimedia stream from the proxy to the user.

34. The computer program product of claim 33, wherein said computer readable program code means for causing the computer to effect dynamically modifying comprises:

computer readable program code means for causing the computer to effect, generating a first stream including the content;

computer readable program code means for causing the computer to effect, generating a second stream including the control specification for the content;

computer readable program code means for causing the computer to effect, receiving a request for the content including the content specification;

computer readable program code means for causing the computer to effect said dynamically modifying includes computer readable program code means for causing the computer to effect dynamically modifying the content of the first stream according to the control specification and the content specification; and computer readable program code means for causing the computer to effect, transmitting the modified multimedia stream.

35. The computer program product of claim 34, further comprising computer readable program code means for causing the computer to effect, determining and notifying a content requester of a percentage of the content that would be modified according to the content specification, in response to said receiving.

36. The computer program product of claim 34, further comprising computer readable program code means for causing the computer to effect, communicating to the requester a blocking indicator, without showing the video, when the percentage exceeds a threshold.

37. The computer program product of claim 34, wherein the control specification includes a multidimensional control specification.

38. The computer program product of claim 33, wherein the content includes video and wherein the control specification includes a fuzz ball specification, said computer readable program code means for causing the computer to effect, dynamically modifying further comprising:

computer readable program code means for causing the computer to effect, generating the fuzz-ball specification corresponding to one or more content specifications;

computer readable program code means for causing the computer to effect, receiving a request for the content including the content specification; and computer readable program code means for causing the computer to effect, dynamically overlaying at least a part of a frame of the video based on the fuzz-ball specification and the content specification, in response to said receiving.

39. The computer program product of claim 38, wherein the content specification and the control specification include a PICS protocol, said computer program product further comprising computer readable program code means for causing the computer to effect, generating separate fuzz-ball specifications corresponding to different content specifications; and computer readable program code means for causing the computer to effect, selecting a fuzz-ball specification based on a PICS specification.

40. The computer program product of claim 39, wherein said computer readable program code means for causing the computer to effect, generating comprises computer readable program code means for causing the computer to effect, generating the fuzz-ball specififcation as one or more fuzz balls having a size, location, and temporal relation to a frame of the video.

41. The computer program product of claim 38, wherein the content specification is time-based.

42. The computer program product of claim 38, further comprising computer readable program code means for causing the computer to effect, overlaying multiple fuzz ball specifications to meet the content specification.

43. The computer program product of claim 33, said computer readable program code means for causing the computer to effect, dynamically modifying further comprising computer readable program code means for causing the computer to effect, combining multiple content specifications covering one of multiple dimensions and rating systems.

44. The computer program product of claim 43, wherein the content includes video, further comprising computer readable program code means for causing the computer to effect, overlaying multiple fuzz-ball filters, in response to said computer readable program code means for causing the computer to effect said combining.

45. The computer program product of claim 33, further comprising computer readable program code means for causing the computer to effect, communicating one of the content specifications and the control specification according to one of: a PICS protocol; a RSTP protocol; and an MPEG protocol.

46. The computer program product of claim 45, wherein the content includes video and the PICS protocol includes a plurality of PICS labels, further comprising computer readable program code means for causing the computer to effect said communicating including computer readable program code means for causing the computer to effect, communicating a V label indicating a content rating of a video and an overlay label to indicate the effect of a modification to the content rating; and computer readable program code means for causing the computer to effect, updating a category value of the V label, in response to said computer readable program code means for causing the computer to effect dynamically modifying.

47. The method of claim 33, wherein the content includes video, further comprising computer readable program code means for causing the computer to effect, dynamically modifying a frame of the video according to the multiple control specifications and the multidimensional content specification.

48. The computer program product of claim 47, wherein the content includes video, said computer readable program code means for causing the computer to effect dynamically modifying the frame of the video further comprising computer readable program code means for causing the computer to effect, masking a frame of the video according to the multiple control specifications and the multidimensional content specification.

49. The computer program product of claim 47, wherein said computer readable program code means for causing the computer to effect dynamically modifying further comprises computer readable program code means for causing the computer to effect, dynamically modifying the frame of the video at one or more of: a content server, a client, a set top box; and a proxy node.

50. The computer program product of claim 33, wherein the network comprises a World Wide Web including a hierarchy of servers, further comprising computer readable program code means for causing the computer to effect an intermediate proxy server to modify content specifications for an outgoing content request.

51. The computer program product of claim 50, wherein the hierarchy includes a heterogeneous proxy hierarchy wherein said computer readable program code means for causing the computer to effect modifying is not performed by the client or all servers in the hierarchy.

52. The computer program product of claim 33, further comprising:

computer readable program code means for causing the computer to effect, multicasting a single multimedia stream to multiple requesters; and computer readable program code means for causing the computer to effect, rendering the video by said requesters, at least two of said requesters rendering the video according to different content specifications.

53. The computer program product of claim 52, further comprising:
  computer readable program code means for causing the computer to effect, generating one or more separate fuzz ball specifications for the different content specifications; and
  computer readable program code means for causing the computer to effect, selecting one or more fuzz ball specifications according to a PICS protocol.

54. The computer program product of claim 33, said computer readable program code means for causing the computer to effect dynamically modifying further comprising computer readable program code means for causing the computer to effect, dynamically bypassing, masking, blocking and substituting objects.

55. The computer program product of claim 54, wherein said content includes video, further comprising computer readable program code means for causing the computer to effect, substituting one or more frames or segments of the video with one or more alternative frames or segments.

56. The computer program product of claim 54 wherein the content comprises video, further comprising computer readable program code means for causing the computer to effect, skipping one of video frames and video segments based on the control specification and the content specification.

57. The computer program product of claim 54, wherein the content includes video, further comprising computer readable program code means for causing the computer to effect one or more of: masking or blocking some portion of one of a video frame and a video stream at one of a server, proxy, set top box, and client.

58. The computer program product of claim 33, said computer readable program code means for causing the computer to effect dynamically modifying further comprising computer readable program code means for causing the computer to effect, generating a second stream including the control specification for the content; wherein the control specification is generated at one of the video header, a group of frames of the video, and an individual frame level.

59. The computer program product of claim 33, further comprising computer readable program code means for causing the computer to effect, communicating the control specification and the content as a single stream.

60. The computer program product of claim 59, wherein the content includes video and wherein said computer readable program code means for causing the computer to effect communicating comprises computer readable program code means for causing the computer to effect communicating the control specification during the vertical blanking interrupt of the multimedia stream.

61. The computer program product of claim 59, wherein computer readable program code means for causing the computer to effect, communicating comprises computer readable program code means for causing the computer to effect, associating a frame label with one or more frames of the video.

62. The computer program product of claim 33, further comprising:
  computer readable program code means for causing the computer to effect, multicasting a single multimedia stream to multiple requesters; and
  computer readable program code means for causing the computer to effect, each requester rendering the video using a at least two different content specifications.

63. The computer program product of claim 33, wherein the objects include one of an identifiable object in the multimedia stream; at least a portion of a frame of video; and a sample of audio.

64. The computer program product of claim 33, wherein the computer readable program code effects transmitting the modified multimedia stream through at least one proxy.

65. In a multimedia network including a multimedia stream, a method of modifying objects associated with content of the multimedia stream, comprising the steps of:
  (a) transmitting a content request including a content specification from at least one of a user and a proxy to a remotely located server, wherein the content request includes a multidimensional content specification;
  (b) determining, in the remotely located server, whether the content of the multimedia stream satisfies the content specification;
  (c) requesting, from the remotely located server, a control specification from a control specification provider based on the result of step (b);
  (d) transmitting the control specification to the proxy responsive to the request of step (c);
  (e) transmitting the multimedia stream to the proxy;
  (f) modifying, in the proxy, one or more objects on one or more dimensions of the multimedia stream based on the content specification and the control specification, said modifying further comprising the step of dynamically modifying a frame of a video according to multiple control specifications and the multidimensional content specification; and
  (g) transmitting the modified multimedia stream to a further proxy.

66. The multimedia network according to claim 65, wherein the further proxy is the user.

67. The multimedia network according to claim 65, further including the step:
  (a1) transmitting a further content specification from a further proxy to the server based on a further content request, the server combing the content specification and the further content specification.

68. In a multimedia network including a multimedia stream, a method of modifying objects associated with content of the multimedia stream, comprising the steps of:
  (a) transmitting a content request including a content specification from at least one of a user and a proxy to a remotely located server, wherein the content request includes a multidimensional content specification;
  (b) determining, in the remotely located server, whether the content of the multimedia stream satisfies the content specification;
  (c) requesting, from the remotely located server, a control specification from a control specification provider based on the result of step (b);
  (d) transmitting the control specification from the control specification provider to the user responsive to the request of step (c);
  (e) transmitting the multimedia stream from the server to the user; and
  (f) modifying, in the user, one or more objects on one or more dimensions of the multimedia stream based on the content specification and the control specification, said modifying further comprising the step of dynamically modifying a frame of a video according to multiple control specifications and the multidimensional content specification.

* * * * *